(12) United States Patent
Lee et al.

(10) Patent No.: US 10,552,890 B2
(45) Date of Patent: Feb. 4, 2020

(54) REFRIGERATOR AND METHOD OF CONTROLLING THE SAME

(71) Applicant: Samsung Electronics Co., Ltd, Gyeonggi-do (KR)

(72) Inventors: Kyung Hoon Lee, Seoul (KR); Sang-Ok Cha, Gyeonggi-do (KR); Pa Ra Kang, Gyeonggi-do (KR); Da Hey Yoo, Seoul (KR); Su Jung Youn, Gyeonggi-do (KR); Kyoung-Ae Lim, Seoul (KR); Ye Eun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 15/256,467

(22) Filed: Sep. 2, 2016

(65) Prior Publication Data

US 2017/0061521 A1 Mar. 2, 2017

(30) Foreign Application Priority Data

Sep. 2, 2015 (KR) .................. 10-2015-0124359

(51) Int. Cl.
*G06Q 30/06* (2012.01)
*G06F 3/0481* (2013.01)
*G06F 3/0484* (2013.01)

(52) U.S. Cl.
CPC ..... *G06Q 30/0631* (2013.01); *G06F 3/04817* (2013.01); *G06F 3/04842* (2013.01); *G06Q 30/0641* (2013.01); *G06Q 30/0639* (2013.01)

(58) Field of Classification Search
CPC .......... G06Q 30/0631; G06Q 30/0639; G06Q 30/0641; G06F 3/04842; G06F 3/04817
(Continued)

(56) References Cited

U.S. PATENT DOCUMENTS

| 5,960,411 A | 9/1999 | Hartman et al. |
| 2012/0260683 A1 | 10/2012 | Cheon et al. |

(Continued)

FOREIGN PATENT DOCUMENTS

| EP | 2447643 A2 * | 5/2012 | ........... F25D 23/126 |
| EP | 2696314 A1 | 2/2014 | |

(Continued)

OTHER PUBLICATIONS

2014-C86463, Feb. 2014, Derwent, Kim.*
(Continued)

*Primary Examiner* — Yogesh C Garg

(57) ABSTRACT

Disclosed herein are a refrigerator and method of controlling the same. Refrigerator includes a memory configured to store at least ones of characteristics of one or more goods items that are able to be stored in the refrigerator and a user's purchasing characteristics; a controller configured to display a user interface including at least one icon for at least one goods item selected based on the at least ones of the characteristics of the goods items and the user's purchasing characteristics stored in the memory, on a display unit, and to collect the user's purchase history to set a method of displaying the at least one icon for the at least one goods item; and a proximity sensor configured to measure a distance to the user, wherein the controller changes the user interface that is displayed on the display unit based on the distance to the user.

21 Claims, 30 Drawing Sheets

(58) Field of Classification Search
USPC ...................................... 705/26.7, 27.1, 26.9
See application file for complete search history.

(56) References Cited

U.S. PATENT DOCUMENTS

| | | | |
|---|---|---|---|
| 2014/0181748 A1* | 6/2014 | Takeda ................ | G06F 3/04817 |
| | | | 715/835 |
| 2015/0006314 A1* | 1/2015 | Goulart .............. | G06Q 30/0631 |
| | | | 705/26.7 |
| 2015/0198940 A1 | 7/2015 | Hwang et al. | |
| 2016/0232502 A1* | 8/2016 | Barbulescu .......... | G06Q 20/108 |

FOREIGN PATENT DOCUMENTS

| | | |
|---|---|---|
| JP | 2013-003834 | 1/2013 |
| KR | 10-2011-0105299 | 9/2011 |
| KR | 10-2013-0017844 | 2/2013 |
| KR | 10-2015-0022303 | 3/2015 |
| KR | 20150080978 A * | 7/2015 ............. G06Q 30/06 |

OTHER PUBLICATIONS

2014-N64229, Jul. 2014, Derwent, Shim.*
Article, "Hefei Midea Royalstar Refriger Files Chinese Patent Application for Refrigerator", publication date: Aug. 3, 2013 in Global IP News; Consumer Electronics Patent News; in New Delhi, India; extracted from Dialog Solutions on Sep. 11, 2019.*
Foreign Communication From a Related Counterpart Application, European Application No. 16182157.4-1605, Extended European Search Report dated Jan. 31, 2017, 6 pages.

\* cited by examiner (a)                 (b)                 (c)

(a)　　　　　　　(b)　　　　　　　(c)

(a) (b) (c)

PRODUCT NAME (a)

PRODUCT NAME (b)

PRODUCT NAME (c)

(a)

(b)

(a)

(b)

REFRIGERATOR AND METHOD OF CONTROLLING THE SAME

CROSS-REFERENCE TO RELATED APPLICATION(S) AND CLAIM OF PRIORITY

The present application is related to and claims the benefit of Korean Patent Application No. 10-2015-0124359, filed on Sep. 2, 2015 in the Korean Intellectual Property Office, the disclosure of which is incorporated herein by reference.

TECHNICAL FIELD

Embodiments of the present disclosure relate to a refrigerator and a control method thereof.

BACKGROUND

A refrigerator means an apparatus for storing goods at low temperature. More specifically, the refrigerator is an apparatus capable of maintaining the temperature of a storeroom at constant temperature or less by repeatedly evaporating and compressing refrigerant in order to store goods at low temperature.

Recently, a refrigerator having various functions in addition to a storage function that is its intrinsic function has been introduced. Accordingly, studies into methods for increasing a user's convenience by providing various functions through a refrigerator are conducted.

SUMMARY

To address the above-discussed deficiencies, it is a primary object to provide a refrigerator, and method for controlling the same that display a user interface based on user's purchase history.

Additional aspects of the disclosure will be set forth in part in the description which follows and, in part, will be obvious from the description, or may be learned by practice of the disclosure.

In accordance with one aspect of the present disclosure, a refrigerator includes a memory configured to store at least ones of characteristics of one or more goods items that are able to be stored in the refrigerator and a user's purchasing characteristics; a controller configured to display, on a display unit, a user interface including at least one icon for at least one goods item selected based on the at least ones of the characteristics of the goods items and the user's purchasing characteristics stored in the memory and to collect a user's purchase history to set a method of displaying the at least one icon for the at least one goods item; and a proximity sensor controlled by the controller, and configured to measure a distance to the user, wherein the controller is further configured to change the user interface that is displayed on the display unit, based on the distance to the user.

Here, the controller is further configured to decide an arrangement order of the at least one icon, based on at least one of a purchase history through the at least one icon, a purchase history received from the user, a purchase history derived from identification information of a goods item put in the refrigerator through image processing, and a purchase history received from an external device.

Also, wherein if the at least one icon is selected by the user, the controller is further configured to control the display unit to display a user interface configured with predetermined information varying according to whether there is a purchase history for a goods item corresponding to the selected icon.

Also, the controller is further configured to collect the purchase history, stores the purchase history in database, and creates a purchase pattern including at least one of product information, a purchasing cycle, and a purchasing quantity, based on the database.

Also, the controller is further configured to decide a goods item that is displayed as an icon on the display unit, based on the purchase pattern for the user.

Also, the controller is further configured to set a method of displaying the at least one icon according to at least one of whether there is a purchase history for the goods item corresponding to the at least one icon and the number of times by which the purchase history for the goods item is collected Also, the controller is further configured to set a display method according to whether a purchase pattern for the goods item corresponding to the icon is created.

Also, the controller is further configured to set an arrangement order of the at least one icon that is displayed on the display unit based on the purchasing cycle.

Also, the controller is further configured to set an arrangement order of the at least one icon according to whether there is a purchase history for the goods item corresponding to the at least one icon, and whether a purchase pattern for the goods item is created.

Also, the controller is further configured to decide an expected date of purchasing based on a starting date calculated using at least one of the purchasing cycle, delivery information, and purchasing information.

Also, if the distance to the user measured by the proximity sensor is shorter than a predetermined distance, and an expected date of purchasing for a goods item according to a purchasing cycle is within a predetermined period, the controller is further configured to control the display unit to display at least one of a product name, an image, a quantity, price information, and a delivery date with respect to the goods item for which the expected date of purchasing is within the predetermined period.

Also, if a plurality of expected dates of purchasing for a plurality of goods items calculated based on the purchase pattern are within a predetermined period, the controller is further configured to group the plurality of goods items to display the plurality of goods items as an icon.

Also, the controller is further configured to decide a display form of the icon based on characteristics of the goods items corresponding to the icon or images of the goods items corresponding to the icon.

Also, if an expected date of purchasing for the goods item calculated based on the purchase pattern approaches within a predetermined period, the controller is further configured to transfer a purchase request message through a communication network.

In accordance with another aspect of the present disclosure, a refrigerator comprising: a communication unit configured to receive at least ones of characteristics of one or more goods items that are able to be stored in the refrigerator and a user's purchasing characteristics; a controller configured to display, on a display unit, a user interface including at least one icon for at least one goods item selected based on the at least ones of the characteristics of the goods items and the user's purchasing characteristics received through the communication unit and to collect a user's purchase history to set a method of displaying the at least one icon for the at least one goods item; and a proximity sensor controlled by the controller, and configured to measure a distance to the user, wherein the controller is further configured to change the user interface that is displayed on the display unit, based on the distance to the user.

Here, the controller is further configured to decide an arrangement order of the at least one icon based on at least one of a purchase history through the at least one icon, a purchase history received from the user, a purchase history derived from identification information of a goods item put in the refrigerator through image processing, and a purchase history received from an external device.

Also, if the at least one icon is selected by the user, the controller is further configured to control the display unit to display a user interface configured with predetermined information varying according to whether there is a purchase history for a goods item corresponding to the selected icon.

Also, the controller is further configured to collect the purchase history, store the purchase history in database, and create a purchase pattern including at least one of product information, a purchasing cycle, and a purchasing quantity, based on the database.

Also, the controller is further configured to set a method of displaying the at least one icon, according to at least one of whether there is a purchase history for the goods item corresponding to the at least one icon and the number of times by which the purchase history for the goods item is collected.

Also, if a plurality of expected dates of purchasing for a plurality of goods items calculated based on the purchase pattern are within a predetermined period, the controller is further configured to group the plurality of goods items to display the plurality of goods items as an icon. As described above, it is possible to provide a service of enabling the user to purchase a product more conveniently.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 29, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device.

Figure 1:
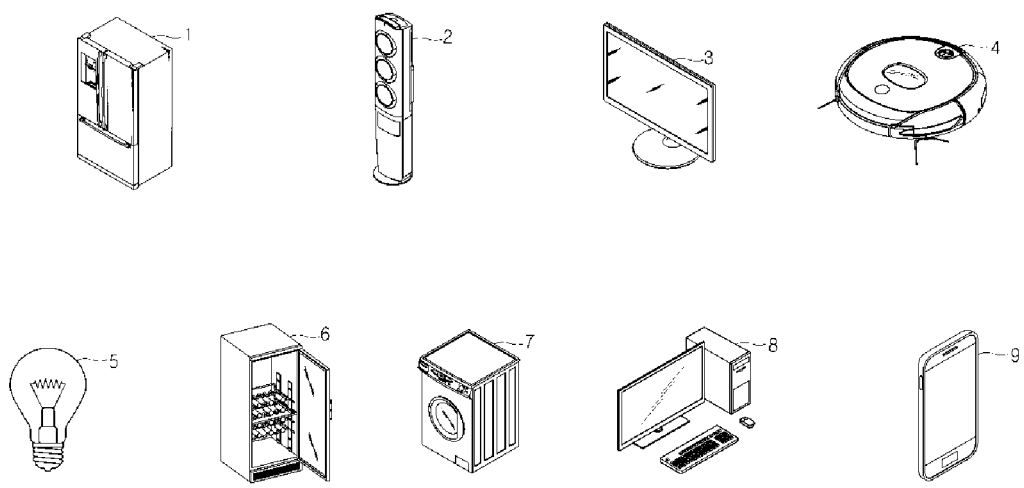
FIG. 1 illustrates a view for describing various kinds of Internet of Things (IoT) devices according to various embodiments of the present disclosure.
Figure 2A:
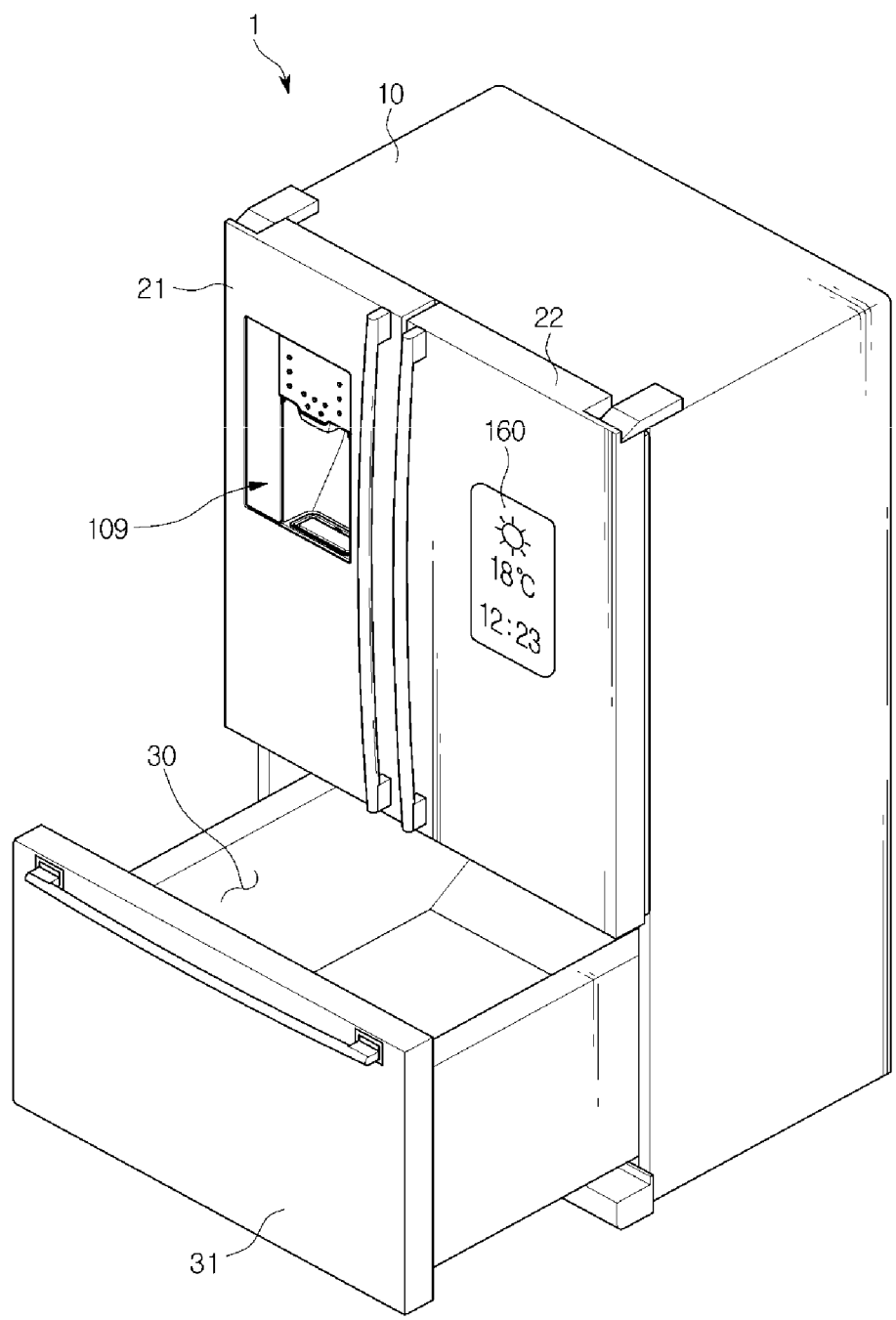
FIGS. 2A and 2B schematically illustrate an outer appearance and an inner appearance of a refrigerator that is an example of IoT devices according to various embodiments of the present disclosure.
Figure 2B:
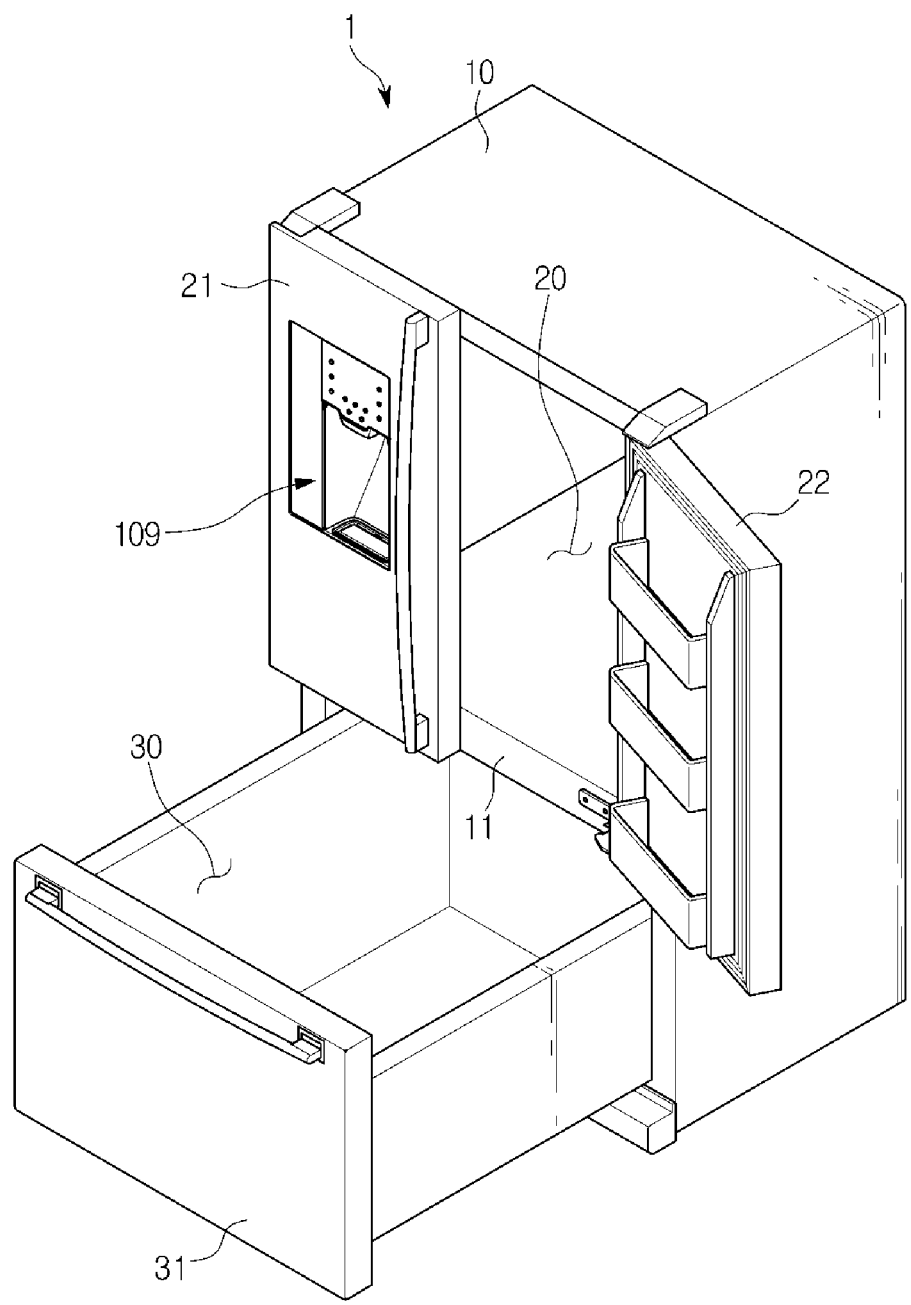
Figure 3:
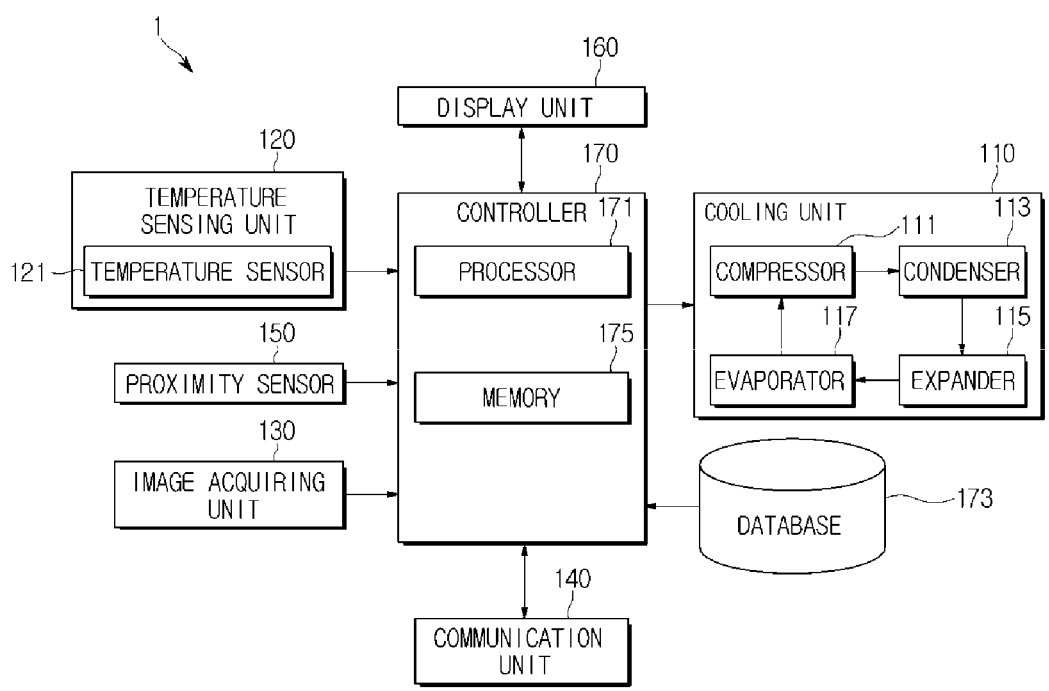
FIG. 3 illustrates a control block diagram of a refrigerator according to various embodiments of the present disclosure.

FIG. 1 is a view for describing various kinds of Internet of Things (IoT) devices according to an embodiment of the present disclosure, FIGS. 2A and 2B schematically show an outer appearance and an inner appearance of a refrigerator that is an example of IoT devices, and FIG. 3 is a control block diagram of a refrigerator according to an embodiment of the present disclosure. The following description will be given by referring to FIGS. 1, 2, and 3 together in order to avoid overlapping of description.

IoT devices, which are implemented as various appliances used in daily life, mean appliances that can access a home network through a communication unit installed therein to transmit or receive data through the home network. For example, the IoT devices may include, as shown in FIG. 1, home appliances (for example, a refrigerator 1, an air conditioner 2, a display device 3, a robot cleaner 4, a lighting fixture 5, a wine refrigerator 6, a washing machine 7, and a desktop computer 8), a smart phone 9, and a wearable user terminal (for example, a wearable clock and a wearable glasses).

The home network means a network that provides a path for connecting to an external internal network, while providing a path for transmitting or receiving data to or from all IoT devices that are indoors. The home network may be integratedly managed by a gateway server. The gateway server, which integratedly manages the home network, may be any one of the IoT devices, which performs the functions of the gateway server, or may be provided as a separate server that performs the functions of the gateway server.

For example, the IoT devices may transmit or receive data to or from one another through the gateway server of the home network. Also, the IoT devices may transmit or receive data to or from one another through machine to machine (M2M) communication.

Meanwhile, in the following description, a refrigerator 1 that is an example of such IoT devices will be described. However, embodiments that will be described below can be limited to the refrigerator 1, and may be applied to all electronic devices that can provide a user with various information through a display, and includes a processor for controlling the operations of the display.

The refrigerator 1 is an apparatus for storing good items at low temperature. More specifically, the refrigerator 1 is an apparatus of maintaining the temperature of a storeroom at a user's desired temperature or less by repeatedly evaporating and compressing refrigerant in order to store good items at low temperature. The refrigerator 1 may include an evaporator, a compressor, a condenser, and an expander, in order to perform evaporation and compression of refrigerant, and detailed descriptions thereof will be given later.

Herein, the good items are various kinds of articles that can be stored at low temperature, and may be, for example, food, medicines, and cosmetics. Also, food or medicines may include all kinds of food and medicines that animals as well as humans can eat. Also, the good items may include various kinds of things for living.

Meanwhile, the refrigerator 1 may include components for performing various additional functions in order to meet a user's various demands. For example, referring to FIG. 2A, the refrigerator 1 may include a dispenser 109 to enable a user to take filtered water or pieces of ice without opening a door 21 of the refrigerator 1. More specifically, the dispenser 109 may be, as shown in FIGS. 2A and 2B, exposed in the front part of the refrigerator 1 so as to enable a user to take filtered water, mineral water, or pieces of ice without opening the door 21 of the refrigerator 1.

Also, referring to FIG. 2B, the refrigerator 1 may include a main body 10 forming an outer appearance of the refrigerator 1, and one or more storerooms 20 and 30 formed in the inside space of the main body 10. In one side of the main body 10, one or more doors 21, 22, and 31 may be provided to open or close the storerooms 20 and 30.

The main body 10 may include an internal structure forming the storerooms 20 and 30, an external structure coupled with the outer part of the internal structure and forming the outer appearance of the refrigerator 1, and an insulator interposed between the internal structure and the external structure, and configured to insulate the storerooms 20 and 30 from the outside.

The storerooms 20 and 30 may be divided into a plurality of storerooms 20 and 30 by an intermediate partition 11. The intermediate partition 11 may divide the storerooms 20 and 30 above and below, or left and right. According to another embodiment, the refrigerator 1 may include a plurality of intermediate partitions 11, and in this case, the storerooms 20 and 30 may be divided into three or more.

The plurality of storerooms 20 and 30 may include a refrigerating compartment to keep goods refrigerated, and a freezing compartment to keep goods frozen. According to an embodiment, the refrigerating compartment may be maintained at about 3° C. to keep food refrigerated, and the freezing compartment may be maintained at about −18.5° C. to keep food frozen. However, the refrigerating temperature and the freezing temperature are not limited to the above-mentioned temperatures.

The front parts of the storerooms 20 and 30 may open for a user to be able to take goods out of the storerooms 20 and 30 or put goods into the storerooms 20 and 30. The opened front parts of the storerooms 20 and 30 may be opened or closed by a pair of doors 21 and 22 coupled with the main body 10 by hinges. According to an embodiment, the opened front parts of the storerooms 20 and 30 may be opened or closed by a sliding door 31 that can slide with respect to the main body 10.

The doors 21 and 22 may include a front part exposed to the outside when the doors 21 and 22 are closed, and a rear part positioned toward the storerooms 20 and 30. Meanwhile, the dispenser 109 may be provided in at least one front part of the doors 21 and 22, although not limited to a location shown in FIGS. 2A and 2B.

Meanwhile, the refrigerator 1 may include a display unit 160 to display various kinds of information. For example, the display unit 160 may be provided in the front part of the refrigerator 1 to display various kinds of information including information about the operation state of the refrigerator 1. According to an embodiment, the refrigerator 1 may control the configuration of a user interface displayed on the display unit 160 to increase a user's convenience. This operation will be described in detail, later.

Referring to FIG. 3, the refrigerator 1 may include, in addition to the above-described components, a cooling unit 110 to supply cool air to the inside of the storerooms 20 and 30, a temperature sensing unit 120 to sense the internal temperatures of the storerooms 20 and 30, an image acquiring unit 130 to acquire image information about the inside areas of the storerooms 20 and 30, a communication unit 140 to transmit or receive data to or from an external device through a communication network, a proximity sensor 150 to measure a distance to a user, the display unit 160 to provide a user with various kinds of information, and a controller 170 to control overall operations of the refrigerator 1.

The cooling unit 110 may supply cool air to the storerooms 20 and 30. More specifically, the cooling unit 110 may maintain the temperature of the storerooms 20 and 30 within a constant temperature range using evaporation of refrigerant.

The cooling unit 110 may include a compressor 111 to compress gaseous refrigerant, a condenser 113 to transform the compressed gaseous refrigerant to liquid refrigerant, an expander 115 to decompress the liquid refrigerant, and an evaporator 117 to transform the decompressed liquid refrigerant to a gas state.

Particularly, the cooling unit 110 may supply cool air to the storerooms 20 and 30 using a phenomenon in which decompressed liquid refrigerant absorbs thermal energy of ambient air when it is transformed to a gas state. However, the components of the cooling unit 110 are not limited to the compressor 111, the condenser 113, the expander 115, and the evaporator 117.

For example, the cooling unit 110 may include a Peltier module using the Peltier effect. The Peltier effect is a phenomenon in which when current flows to a contact surface at which different kinds of metal contact, one metal generates heat, and the other metal absorbs heat. Accordingly, the cooling unit 110 may supply cool air using the Peltier module.

As another example, the cooling unit 110 may include a magnetic cooling device using the magneto-caloric effect. The magneto-caloric effect is a phenomenon in which a specific material (magnetocaloric material) is magnetized to emit heat, and demagnetized to absorb heat. Accordingly, the cooling unit 110 may supply cool air to the storerooms 20 and 30 using the magnetic cooling device. Also, the cooling unit 110 may be implemented as any one of various devices well-known to those of ordinary skill in the art.

Meanwhile, the temperature sensing unit 120 may include a temperature sensor 121 installed in the inside of the storerooms 20 and 30, and configured to detect the inside temperatures of the storerooms 20 and 30. The temperature sensor 121 may be a thermistor whose electrical resistance changes according to temperature. Meanwhile, if the storerooms 20 and 30 are divided into a plurality of storerooms, the temperature sensor 121 may be installed in each storeroom.

Meanwhile, the refrigerator 1 may include an image acquiring unit 130. The image acquiring unit 130 may acquire image information, and derive necessary information from the image information through image processing. For example, the image acquiring unit 130 may be implemented as a camera module.

The image acquiring unit 130 may be installed in the inside of the refrigerator 1. The image acquiring unit 130 may be positioned at any location at which image information about the inside area of the refrigerator 1 can be acquired. Also, the image acquiring unit 130 may be installed in each storeroom.

For example, the image acquiring unit 130 may include a lens to concentrate light radiated or reflected from the front part of the main body 10 of the refrigerator 1, and an image sensor to convert the concentrated light into an electrical signal. The image sensor may be a complementally metal oxide semiconductor (CMOS) sensor or a charge coupled device (CCD) sensor.

According to an embodiment, the image acquiring unit 130 may acquire image information including images of goods items stored in the inside of the refrigerator 1, and derive identification information for identifying the goods items from the image information through image processing. Also, the image acquiring unit 130 can determine whether good items are taken out of or put in the storerooms 20 and 30 through image processing. The identification information of the goods items may include product names, brand names, expiration dates, etc. of the good items. For example, the identification information of the goods items may be acquired from barcodes attached on the goods items.

The image acquiring unit 130 may transfer the identification information to the controller 170 so that the controller 170 can recognize the current states of the good items stored in the storerooms 20 and 30 and determine whether the good items are taken out of or put in the storerooms 20 and 30. Meanwhile, the image processing may be performed by the controller 170, instead of the image acquiring unit 130. The controller 170 will be described in more detail, later.

Meanwhile, referring to FIG. 3, the refrigerator 1 may include a communication unit 140.

The communication unit 140 may transmit or receive various data to or from an external device through a wireless communication network or a wired communication network. The wireless communication network means a communication network through which signals including data are transmitted or received in a wireless fashion.

For example, the communication unit 140 may transmit or receive radio signals between devices via a base station through a communication method, such as 3Generation (3G) communication, 4Generation (4G) communication, etc. Also, the communication unit 140 may transmit or receive radio signals including data to or from a terminal within a predetermined distance through a communication method, such as wireless local area network (WLAN), wireless-fidelity (Wi-Fi), BLUETOOTH, ZIGBEE, Wi-Fi direct (WFD), ultra wideband (UWB), infrared data association (IrDA), BLUETOOTH low energy (BLE), near field communication (NFC), etc.

Meanwhile, the wired communication network means a communication network through which signals including data are transmitted or received in a wired fashion. For example, the wired communication network may include peripheral component interconnect (PCI), PCI-express, universe serial bus (USB), etc. However, the wired communication network is not limited to these. The communication network that will be described below includes both a wireless communication network and a wired communication network.

The communication unit 140 may transmit or receive data directly to or from an external device through a communication network, or may transmit or receive data to or from an external device through a home gateway server located indoors.

For example, the communication unit 140 may receive information related to a user's purchase history through the communication network. For example, the communication unit 140 may receive information related to a user's purchase history stored in a user terminal or an external server through the communication network. The user terminal may store an application to manage good items that the user has purchased. Accordingly, the communication unit 140 may receive information related to the user's purchase history stored in the user terminal through the communication network.

Also, when the user purchases goods items through a credit card, information related to the user's purchase history may be stored in a server of a card company or a server of a shopping mall that sold the goods items. Accordingly, the communication unit 140 may receive the information related to the user's purchase history from such an external server through the communication network.

Meanwhile, the communication unit 140 may transmit information related to the user's purchase history to the external server, and receive information about a purchase pattern created based on the user's purchase history from the external server. The external server may include a processor to create a purchase pattern using a purchase history of a refrigerator, which will be described later. Accordingly, the refrigerator 1 may cause the external server to perform a process of analyzing a purchase history to create a purchase pattern, so as to be prevented from being overloaded.

Also, the communication unit 140 may receive information about a user interface configured based on the purchase pattern. As described above, the external server may create a purchase pattern, and decide a configuration of a user interface based on the purchase pattern. Accordingly, the communication unit 140 may receive information about a user interface from the external server, and the controller 170 may display the user interface on the display unit 160 based on the information about the user interface.

Meanwhile, operations of the controller 170 and the communication unit 140 are not limited to the above-described operations, and the controller 170 can itself create a purchase pattern based on a purchase history, and configure a user interface that is to be displayed on a screen based on the purchase pattern. This process will be described in detail, later.

Meanwhile, the refrigerator 1 may include the display unit 160. The display unit 160 may be disposed at a predetermined area on the front part of the refrigerator 1. According to an embodiment, the display unit 160 may be implemented as a liquid crystal display (LCD), a light emitting diode (LED) display, a plasma display panel (PDP), an organic light emitting diode (OLED) display, or a cathode ray tube (CRT) display, although not limited to these.

Meanwhile, the refrigerator 1 may include a proximity sensor 150. The proximity sensor 150 is a sensor capable of measuring a position of an object, that is, a distance to the object. The proximity sensor 150 may be implemented in various ways.

For example, the proximity sensor 150 may be implemented with a permanent magnet and a hole device in which internal current changes by the influence of a magnetic field, or with a lamp (or a LED) and an optical sensor. According to another example, the proximity sensor 150 may be implemented by a method of detecting a change in capacitance.

According to another example, the proximity sensor 150 may irradiate an ultrasonic signal, receive the ultrasonic signal reflected from an object, and thus measure a distance to the object. Also, the proximity sensor 150 may be implemented by various methods well-known to one of ordinary skill in the art.

Meanwhile, the proximity sensor 150 may be installed in the front part of the refrigerator 1. Accordingly, the proximity sensor 150 may measure a distance from the front part of the refrigerator 1 to the user. According to an embodiment, if the user is located more distant than a predetermined distance, or if no user is detected within a sensing range of the proximity sensor 150, the controller 170 may configure a user interface that a distant user can easily recognize, and display the user interface on the display unit 160.

The user interface means an environment configured to enable a user to easily control components of the refrigerator 1 and programs, etc. stored in the refrigerator 1, and to easily recognize various information. The user interface, which will be described below, may be a graphic user interface that implements a screen displayed on the display unit 160 with graphics so that various information and commands can be more conveniently exchanged between the user and the refrigerator 1.

For example, the graphic user interface may be configured to display icons, buttons, etc. for enabling the user to easily input various control commands on a region of a screen displayed through the display unit 160, and to display various information through at least one widget on the other region of the screen.

Meanwhile, a configuration of the user interface that is displayed on the display unit 160 may change according to a distance between the user and the refrigerator 1. For example, if the user is located distant from the refrigerator 1, the user cannot have a close look at various information displayed on the display unit 160. Also, if the user is located distant from the refrigerator 1, there may be high probability that the user is less concerned with operation of the refrigerator 1.

Accordingly, the controller 170 may display a user interface configured to provide the user with information about a daily life, on the display unit 160. Also, if it is determined that the user is located distant from the refrigerator 1, the controller 170 may change a display method to enlarge various information, buttons, etc. which are displayed on the display unit 160. The controller 170 will be described in detail, later.

Figure 4:
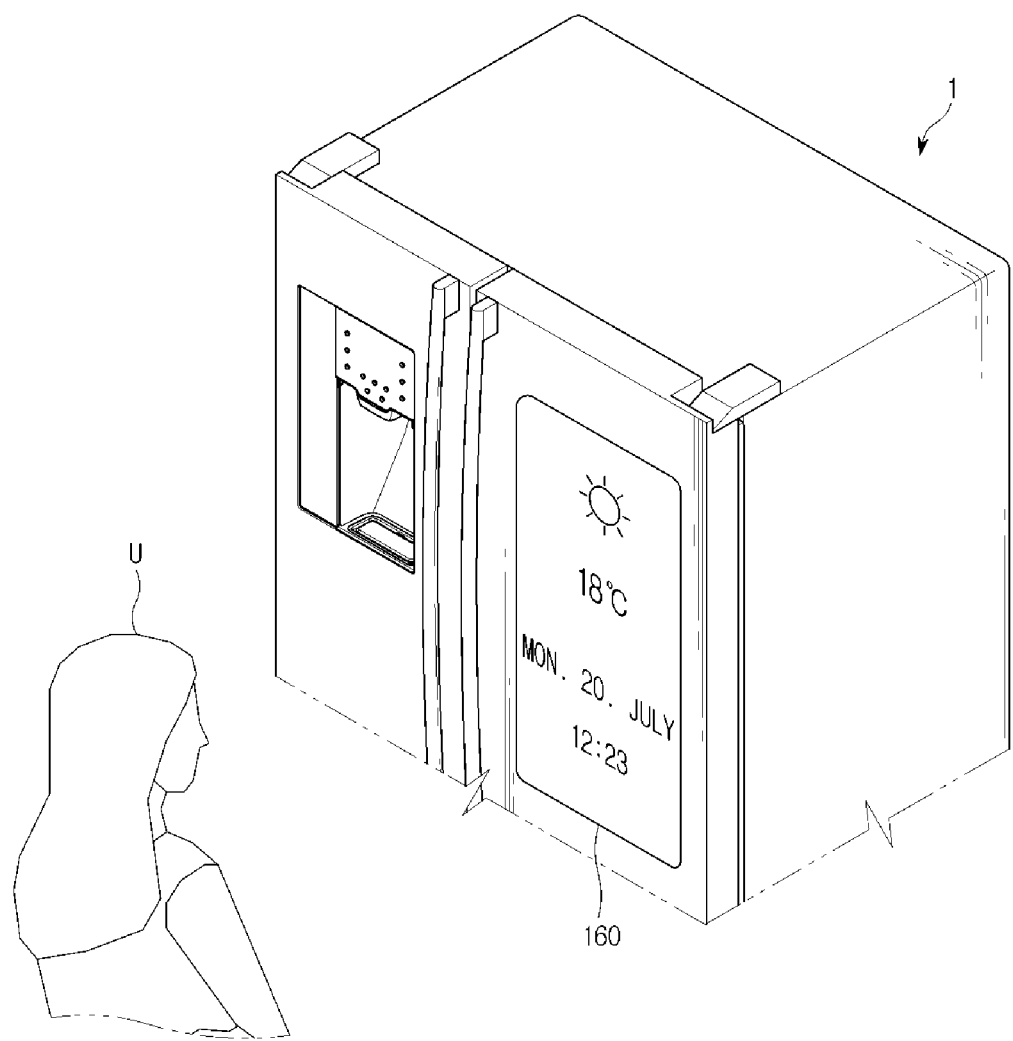
FIG. 4 and FIG. 5 illustrate view for describing an case to change a user interface on a display unit based on distance between a refrigerator and a user according to various embodiments of the present disclosure.
Figure 5:
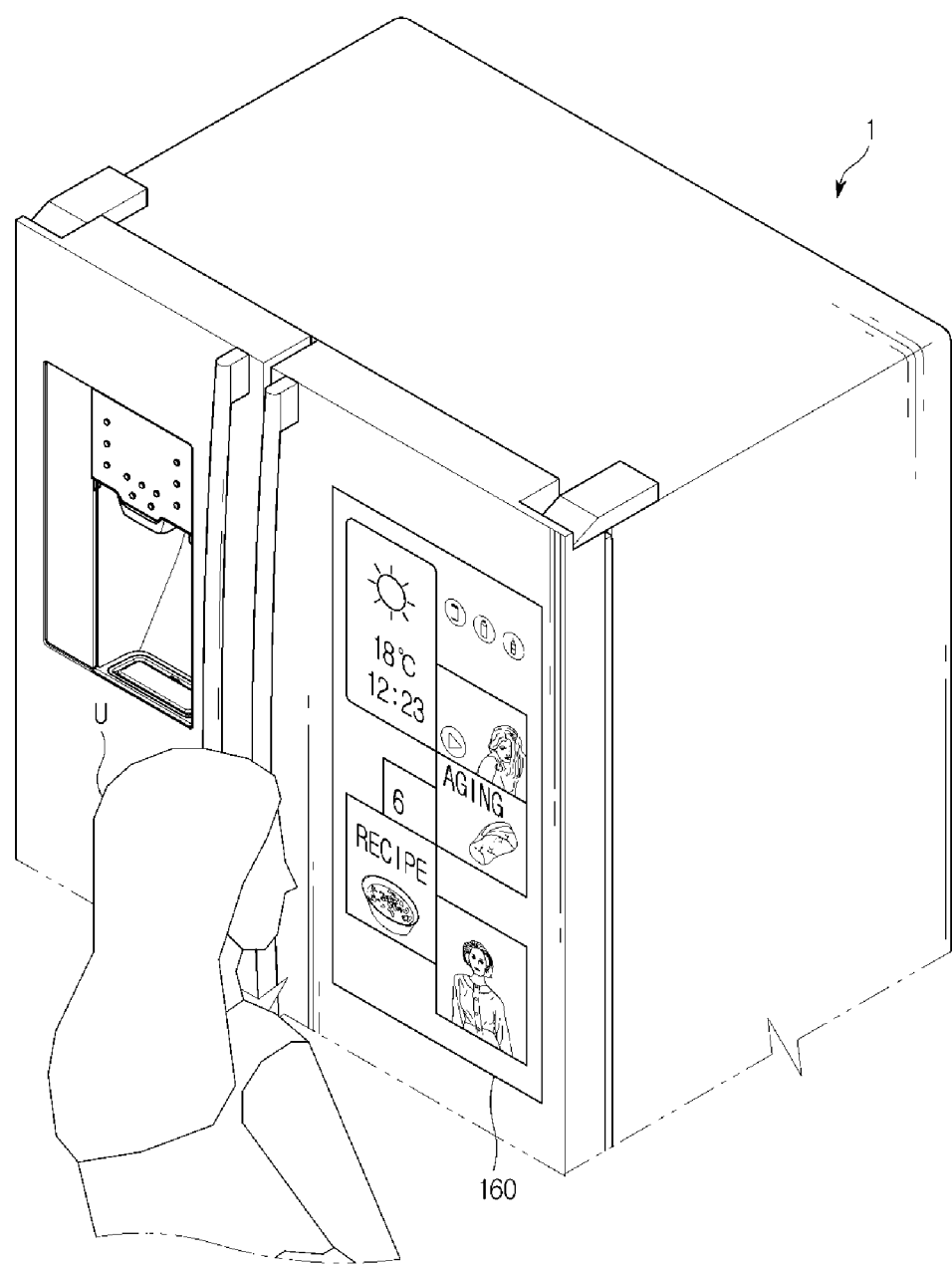

According to an embodiment, as shown in FIG. 4, a user interface including a region in which information about current weather, current temperature, and the like is displayed may be displayed on the display unit 160. According to another embodiment, if a user is detected within a predetermined distance from the front part of the refrigerator 1, the operation state of the refrigerator 1 and various information related to the operation state of the refrigerator 1, in addition to general information, may be displayed on the display unit 160, which is shown in FIG. 5. This operation will be described in detail, later.

Meanwhile, the refrigerator 1 may include database 173. The database 173 may be implemented with at least one type of storage medium among a flash memory type, a hard disk type, a multimedia card micro type, card type memory (for example, secure digital (SD) or extreme digital (XD) memory), random access memory (RAM), static random access memory (SRAM), read-only memory (ROM), electrically erasable programmable read-only memory (EEPROM), programmable read-only memory (PROM), magnetic memory, a magnetic disk, and an optical disk. However, the database 173 is not limited to the above-mentioned storage media, and may be implemented with another arbitrary storage medium well-known in the art.

Data about the user's purchase history may be stored in the database 173. For example, a log file in which the user's purchase history is written may be stored in the database 173.

The log file may be created by a processor 171 which will be described later. In the log file, data about goods items that the user has purchased, such as the names, manufacturing companies, brands, quantities, etc. of the goods items, dates and times at which the user has purchased the goods items, etc. may be stored. The processor 171 may create purchase patterns of the good items based on the user's purchase histories stored in the database 173. This operation will be described in detail, later.

Meanwhile, the controller 170 may control overall operations of the refrigerator 1. The controller 170 may include the processor 171 and memory 175, as shown in FIG. 3. The processor 171 and the memory 175 may be integrated into a system on chip (SOC) installed in the refrigerator 1. However, since a plurality of SOCs can be installed in the refrigerator 1, the processor 171 and the memory 175 may also be integrated into a plurality of SOCs.

The memory 175 may store control programs or control data for controlling operations of the refrigerator 1, or may temporarily store control command data or image data output from the processor 171.

The memory 175 may include volatile memory (for example, SRAM and DRAM), flash memory, and non-volatile memory (for example, ROM, EPROM, and EEPROM). However, the memory 175 is not limited to the above-mentioned memory, and may be implemented with another type of memory well-known in the art. For example, the non-volatile memory may store control programs and control data for controlling operations of the refrigerator 1, and the volatile memory may load the control programs and the control data from the non-volatile memory to temporarily store the control programs and the control data, or may temporarily store control command data or image data output from the processor 171.

Meanwhile, the database 173 and the memory 175 may be implemented as separate chips or a single chip.

The processor 171 may generate control signals, and control the operations of the individual components of the refrigerator 1 based on the generated control signals. For example, the processor 171 may process data stored in the memory 175 according to a control program stored in the memory 175. According to another example, the processor 171 may control the cooling unit 110 based on the result of sensing by the temperature sensing unit 120 so that the storerooms 20 and 30 can be maintained at a constant temperature.

Also, the processor 171 may control operations of the display unit 160, and control a screen that is displayed on the display unit 160, according to control signals. Also, the processor 171 may create a user interface that is displayed on the display unit 160. According to an embodiment, the processor 171 may include a graphic processor, and can create a graphic user interface that is displayed on the display unit 160.

The processor 171 may change the entire or a part of the configuration of the user interface, or change a method of displaying icons, buttons, etc. included in the user interface, according to a situation.

For example, the processor 171 may change the user interface that is displayed on the display unit 160, based on a distance to the user, measured by the proximity sensor 150, as described above.

If the user is located near the refrigerator 1, there may be high probability that the user approached close to the refrigerator 1 to control the operation of the refrigerator 1 or to use a service provided by the refrigerator 1. Accordingly, the controller 170 may measure a distance between the user and the refrigerator 1 through the proximity sensor 150, and if the controller 170 determines that the user is located close to the refrigerator 1, the controller 170 may display a user interface configured with icons for supporting the operation of the refrigerator 1 and a connection to a service providable through the refrigerator 1, thereby increasing the user's convenience.

For example, as shown in FIG. 4, if a distance to a user U is longer than a predetermined distance, or if no user is detected, the processor 171 may display a user interface configured with widgets of displaying weather, temperature, date, time, etc., as shown in FIG. 4.

According to another example, if the distance to the user U is shorter than or equal to the predetermined distance, the processor 171 may control the display unit 160 to display a user interface configured with widgets of displaying various information, as shown in FIG. 5.

That is, the configuration of the user interface that is displayed on the display unit 160 may change according to a distance to a user. In other words, a distance to a user may be a trigger for changing the user interface.

Meanwhile, a distance to a user, which is used as criterion for changing the user interface, may have been set in advance. For example, a distance to a user may be set by a user, or may have been set in advance by a designer when the refrigerator 1 was designed. Specifically, the configuration of the user interface may change according to whether a distance to a user is shorter than 70 cm.

Meanwhile, changing the user interface displayed on the display unit 160 is not limited to changing the user interface according to a distance to a user. For example, if the display unit 160 is a touch screen type, the user may touch or flick the display unit 160 shown in FIG. 4 to change to the user interface shown in FIG. 5.

Also, a door opening/closing sensing unit for sensing opening or closing of storeroom doors may be installed in the storerooms 20 and 30 of the refrigerator 1. If the storerooms 20 and 30 are divided into a plurality of storerooms, the door opening/closing sensing unit may be installed in each of the plurality of storerooms.

For example, the door opening/closing sensing unit may be implemented with a temperature sensor, an infrared sensor, an ultrasonic sensor, a hole sensor, or a micro switch. However, the door opening/closing sensing unit may be implemented with any other sensor or device well-known to one of ordinary skill in the art, as long as it can sense opening or closing of a door. The controller 170 may change the user interface according to whether the doors 21, 22, and 31 of the storerooms 20 and 30, as shown in FIGS. 2A and 2B, open or close. That is, opening or closing of the doors 21, 22, and 31 may be a trigger for changing the user interface.

Meanwhile, a method of displaying widgets and icons configuring the user interface, a method of arranging the widgets and icons, etc., which will be described later, may be embodied as an algorithm or program, and stored in the memory 175. Accordingly, the processor 171 may create a user interface using data stored in the memory 175. Alternatively, the algorithm or program may be stored in an external device. Accordingly, the processor 171 may receive data related to a user interface derived by an external device through an algorithm or program, through the communication unit 140, and display the user interface on the display unit 160 based on the data related to the user interface.

Hereinafter, a method in which the controller 170 including the processor 171 and the memory 175 creates a user interface that is displayed on the display unit 160 will be described.

For example, the controller 170 may display a user interface configured to provide various information through at least one widget, on the display unit 160. Herein, the widget means a mini application program that is a kind of a graphic user interface to enable a user to easily interact with application programs providing various kinds of services. That is, a user can easily use various kinds of application programs and check various information, through the widget.

Also, the user interface may be divided into a plurality of regions in such a way that one or more widgets are arranged in a part of the divided regions to display various kinds of information, and media, such as icons, buttons, etc., for receiving control commands or supporting connections to applications is arranged in the other part of the divided regions. Herein, the sizes of the divided regions may be set to various values.

For example, the user interface may be implemented as a magazine-type graphic user interface that is divided into a plurality of regions to provide various information. According to an embodiment, the user interface may be divided into a region of displaying information about the operation state of the refrigerator 1, a region of displaying life information related to the operation state of the refrigerator 1, a region of enabling a user to input a control command for controlling components of the refrigerator 1 or an external device, and a region of displaying various kinds of services that can be provided through the refrigerator 1.

The information about the operation state of the refrigerator 1 means various information about operations that the refrigerator 1 is performing, such as an operation mode being performed through the components of the refrigerator 1, the results of processing according to the operation mode, a completion expected time of the operation, etc. Also, the life information related to the operation state of the refrigerator 1 means life information closely related to the operations of the refrigerator 1.

For example, if meat is being aged in an aging mode, information about the operation state of the refrigerator 1 may include the progress of aging and a completion expected time of aging. Also, the life information related to the operation state of the refrigerator 1 may include information closely related to results according to the operation of the refrigerator 1, such as recipes using aged meat, recommendation information about wines matching aged meat, etc.

Also, the various kinds of services that can be provided through the refrigerator 1 may include all functions that can be provided through the components of the refrigerator 1, and various functions that can be provided in connection to an external device, as well as a function of storing goods items, which is the intrinsic function of the refrigerator 1.

That is, the controller 170 may provide the user with a magazine type user interface through the display unit 160 so that the user can see various kinds of information related to daily life, in addition to information related to the refrigerator 1, at a glance, thereby increasing visualization.

Figure 6:
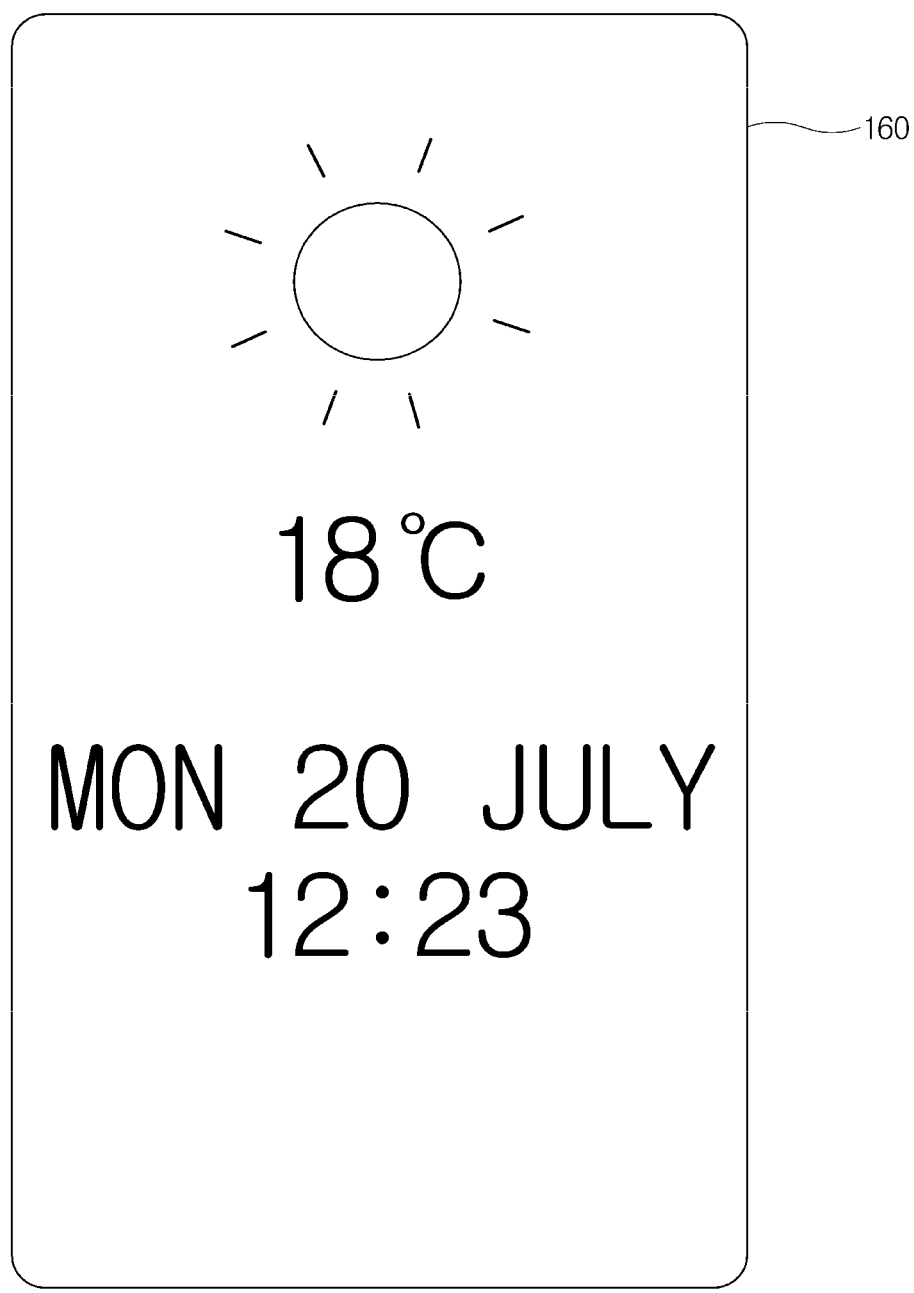
FIG. 6 and FIG. 7 illustrate a screen in which a user interface on the display unit according to various embodiments of the present disclosure.
Figure 7:
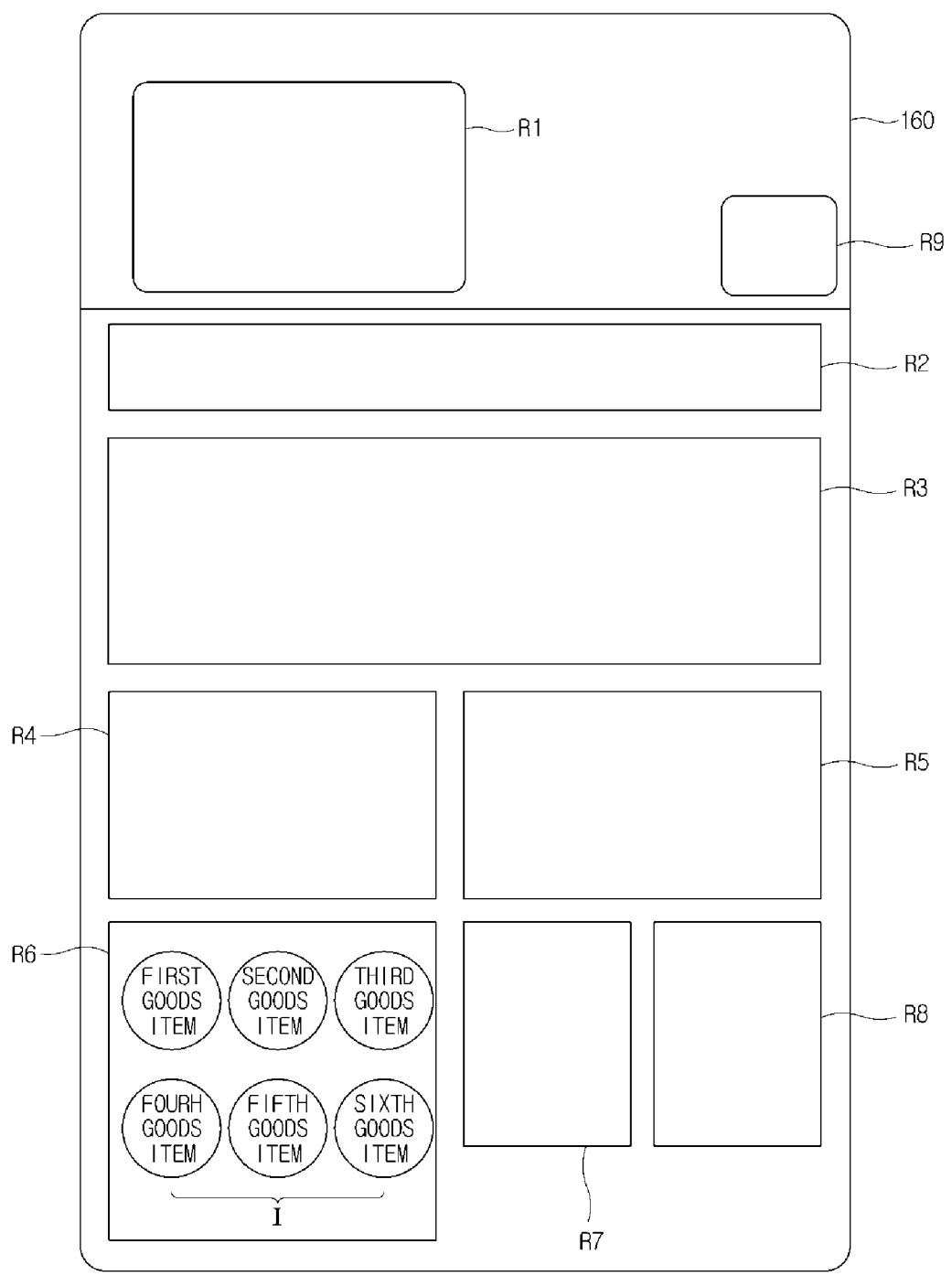

FIG. 6 and FIG. 7 shows a screen in which a user interface according to an embodiment is displayed on the display unit 160. For example, the controller 170 may configure a user interface divided into a plurality of regions (that is, first, second, third, fourth, fifth, sixth, seventh, eighth, and ninth regions R1, R2, R3, R4, R5, R6, R7, R8, and R9), and display the user interface on the display unit 160.

In the plurality of first to ninth regions R1 to R9, various information may be displayed through widgets, and also icons, buttons, etc. for supporting connections to specific applications or enabling a user to input control commands may be arranged.

For example, in the first region R1, date information, time information, and temperature information received from the Web through the communication unit 140 may be displayed. Also, in the second region R2, a pop-up message may be displayed.

Also, in the third, fourth, and fifth regions R3, R4, and R5, information about the operation state of the refrigerator 1, life information related to the operation state of the refrigerator 1, and music streaming information, etc. may be respectively displayed. Also, in the seventh and eighth regions R7 and R8, icons, buttons, etc. which are media for connecting to various kinds of applications may be displayed. Also, in the ninth region R9, an icon for supporting a connection to an edit application for enabling a user to edit widgets, icons, etc. that are displayed on the display unit 160 may be displayed.

Also, in the sixth region R6, as shown in FIG. 7, a plurality of icons I related to a purchasing service for a plurality of goods items may be arranged in correspondence to the plurality of goods items. Meanwhile, if a user clicks one of the icons I, the user interface may be changed to another user interface providing information about a goods item corresponding to the clicked icon.

The number of the icons I that are displayed in the sixth region R6 may have been set in advance. If the user touches the sixth region R6, the controller 170 may change the current screen to another screen that enables the user to select various kinds of good items, in addition to the good items mapped to the icons I displayed in the sixth region R6.

Figure 8:
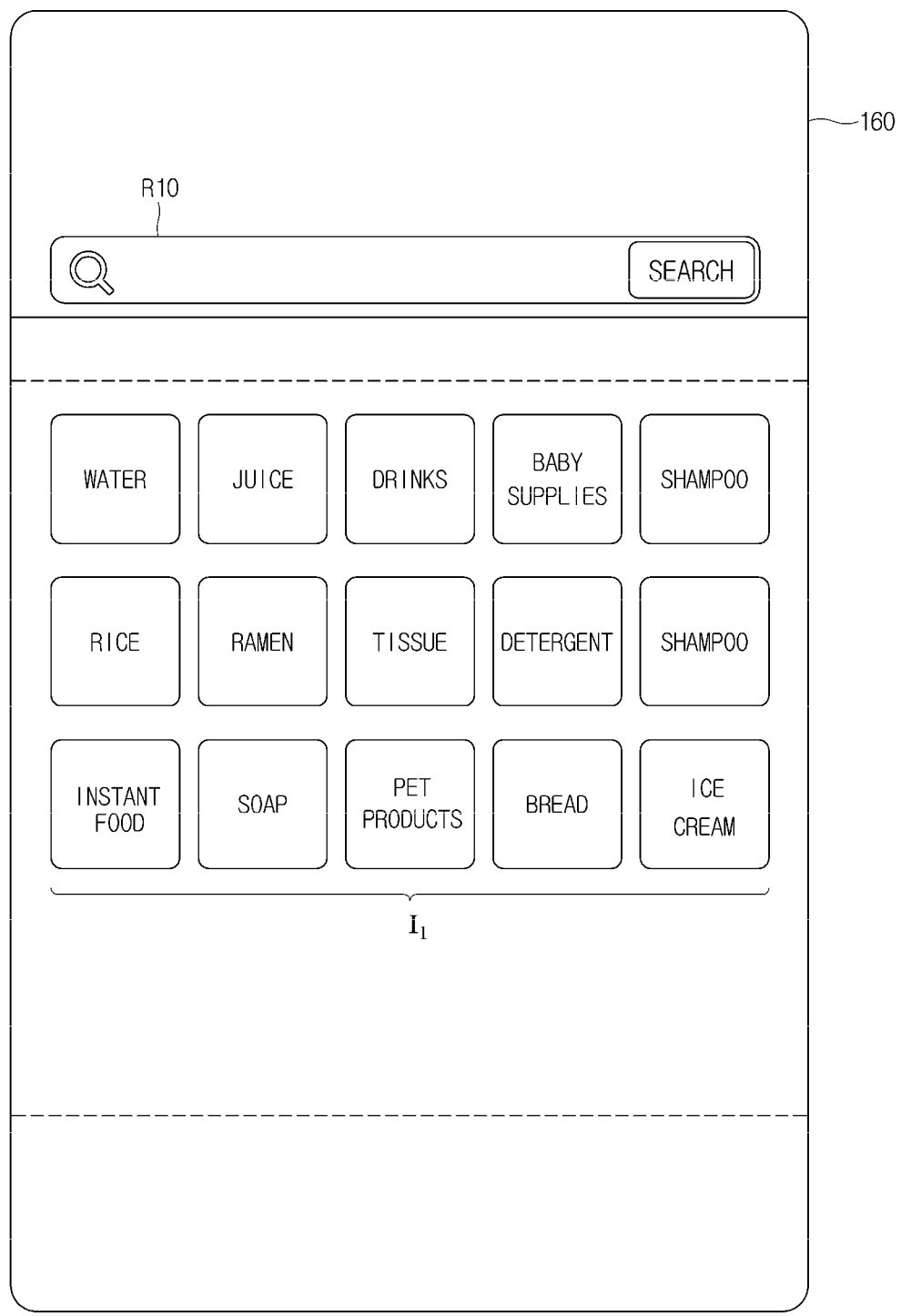
FIG. 8 illustrates a screen that provides various goods items according to categories on the display unit according to various embodiments of the present disclosure.

FIG. 8 shows a screen that provides various goods items according to categories on the display unit 160 according to an embodiment of the present disclosure.

As shown in FIG. 8, a user interface in which a plurality of icons I1 for various kinds of goods items are arranged, and a button for enabling a user to search for a goods item is disposed in a tenth region R10 may be displayed on the display unit 160. Accordingly, the user can easily purchase his or her desired goods item. Meanwhile, the user interface may be configured in any other various forms, instead of the form of a plurality of divided regions as shown in FIG. 7.

Figure 9:
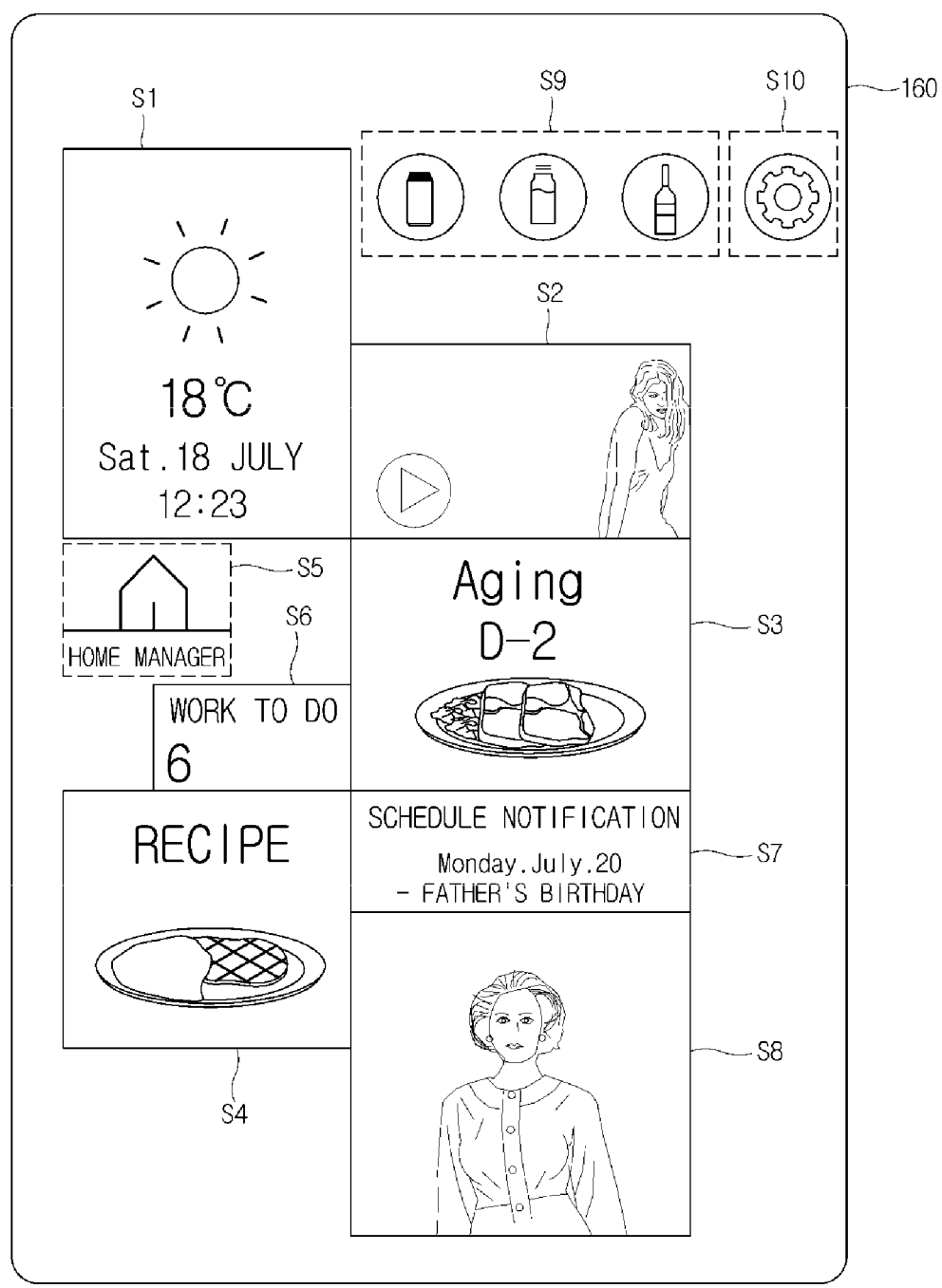
FIG. 9 illustrates a screen configured with a user interface according to various embodiments of the present disclosure.

For example, FIG. 9 shows a display screen configured with a user interface according to an embodiment of the present disclosure. The controller 170 may display a graphic user interface configured with a plurality of regions, on the display unit 160, as shown in FIG. 9.

More specifically, a user interface displayed on the display unit 160 may be divided into a region S1 of displaying weather, time, and temperature, a region S2 of displaying music streaming information, a region S3 of displaying remaining time until aging of meat is completed according to an aging mode, and a region S4 of displaying information about recipes using aged meat.

Also, the user interface may be configured with a region S5 of displaying an icon for executing an application for controlling IoT devices through a home network, a region S6 of briefly displaying information about work to do, a region S7 of displaying schedule information, a region S8 of displaying an image-of-interest, a region S9 of displaying icons for executing a purchasing service for goods items, and a region S10 of displaying an icon for supporting a connection to an edit application for editing the user interface.

The controller 170 may provide a user with a magazine type user interface through the display unit 160 so that the user can see various kinds of information related to daily life, in addition to information related to the refrigerator 1, at a glance. That is, the controller 170 may provide various information closely related to a user's real life, in addition to information about the refrigerator 1, thereby increasing the user's convenience.

Meanwhile, referring to FIG. 9, one or more icons for supporting a connection to an application related to purchasing goods items may be provided on the display unit 160. The controller 170 may set a goods item for each icon. That is, each icon may be mapped to a goods item.

The icons for the goods items may be respectively displayed by different display methods according to whether purchasing histories for the goods items have been collected and whether purchase patterns for the goods items have been created. Also, the shapes of the icons and methods of displaying the icons may change according to the number of times by which purchase histories about the corresponding goods items have been collected, whether purchase patterns for the goods items have been created, and whether purchasing times for the goods items overlap.

Hereinafter, a method of displaying icons when no user's purchase history is collected will be described.

The kinds of goods items that are purchased may vary depending on users. For example, if a user keeps a pet, he or she may purchase pet products, such as pet food, pet medicine, etc. Also, users keeping pets may purchase different pet products according to their tastes. That is, since users have different brand preferences and manufacturer preferences, they may purchase different products for the same kind of goods item. Accordingly, it is difficult to recognize a user's purchasing characteristic until the user's purchase history is collected.

Accordingly, the controller 170 may select goods items that are displayed through icons, based on at least ones of the characteristics of goods items stored in the refrigerator 1 and a general user's purchasing characteristics. The goods items selected based on the at least ones of the characteristics of the goods items and the general user's purchasing characteristics will be referred to as representative goods items. The representative goods items may be selected depending on countries, regions, and climates. For example, goods items that a user purchases in bulk and repeatedly may be selected as representative goods items.

Herein, the characteristics of goods items may include the characteristic of a goods item that needs to be purchased periodically since it is consumed periodically by a user, the characteristic of a goods item that needs to be purchased periodically since it is heavy or bulky, or the characteristic of a goods item that is purchased generally in bulk. Also, the characteristics of goods items mean the characteristic of a goods item that can be stored for a long time since its expiration date is long.

That is, the controller 170 may select goods items that the user purchases periodically on average online, in consideration of the characteristics of goods items that can be stored in the refrigerator 1, and arrange the goods items as icons on the user interface so that the user can easily purchase the goods items.

Also, the user's purchasing characteristics may include a general user's purchasing characteristics according to countries or regions where the refrigerator 1 is sold or the climates of the countries or regions. For example, goods items that a user purchases repeatedly may depend on a country in which he or she resides. For example, in Korea or America, beef, liquor, etc. may be selected as representative goods items, whereas in India, beef may be not selected as a representative goods item. Also, Korean users may purchase kimchi repeatedly to store it in the refrigerator 1, unlike American users.

Accordingly, the controller 170 may decide representative goods items that are to be displayed as icons, based on the characteristics of goods items and the user's purchasing characteristics, and then display icons for the representative goods items on the display unit 160. Data about the decided goods items may be stored in the database 173, or received from an external server through the communication unit 140.

As such, the controller 170 may display icons to enable the user to easily purchase representative goods items that he or she purchases periodically, on the display unit 160, thereby increasing the user's convenience. In other words, the controller 170 may display representative goods items that the user purchases inertially as icons to simplify a purchasing procedure, thereby providing an inertial purchasing user interface to enable the user to easily purchase the goods items. Also, the controller 170 may collect the user's purchase histories to update the configuration of the inertial purchasing user interface, thereby more simplifying a purchasing procedure, which will be described later.

Meanwhile, by collecting the user's purchase histories to create purchase patterns, goods items that are displayed as icons may vary. That is, the controller 170 may reflect each user's purchase histories to adaptively change the user interface.

For this, the controller 170 may display icons for goods items that the user purchases periodically on the display unit 160 to induce the user to repeatedly purchase the goods items, thereby collecting the user's purchase histories. Accordingly, the controller 170 may create purchase patterns based on the user's purchase histories, thereby providing a purchasing support service that is suitable for the user.

Figure 10:
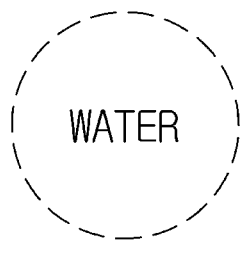
FIG. 10 illustrates icons for goods items having no purchase histories according to various embodiments of the present disclosure.
Figure 10:
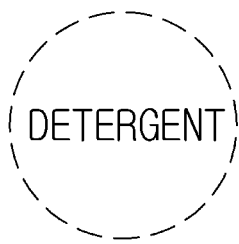
Figure 10:
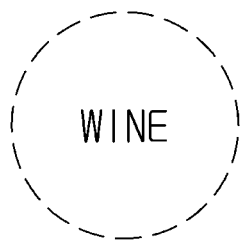

For example, FIG. 10 shows icons for goods items having no purchase histories. The controller 170 may display icons for goods items having no purchase histories by representing the outlines of the icons with dotted lines. The icons are shown in FIGS. 10(a), 10(b), and 10(c).

At this time, the controller 170 may display names of the goods items in the form of text. Meanwhile, the controller 170 may differentiate a method of displaying icons for goods items having purchase histories from a method of displaying icons for goods items having no purchase histories.

Hereinafter, a method in which the controller 170 collects a user's purchase history and a method in which the controller 170 configures a user interface to be displayed through the display unit 160 will be described.

The controller 170 may collect a user's purchase history and store the user's purchase history in the database 173 using various methods. For example, the controller 170 may collect a user's purchase history from identification information derived through the image acquiring unit 130, as described above. Meanwhile, the controller 170 may receive image information from the image acquiring unit 130, and derive identification information from the image information through image processing.

According to another example, the controller 170 may collect a user's purchase history from an external server through the communication unit 140. The user may purchase goods items at an on-line shopping mall. In this case, a server managed by the on-line shopping mall or a company server of a credit card that the user used to purchase the goods items may store information about the user's purchasing, that is, information about the user's purchase history. The controller 170 may control the communication unit 140 through a control signal to receive the information, and store the received information in the database 173.

According to another example, the controller 170 may interwork with a user terminal through the communication unit 140 to receive the user's purchase history from the user terminal. The user terminal can include a communication module to transmit or receive data to or from an external terminal through a communication network. The user terminal may be any terminal capable of processing the operation through a processor.

According to an embodiment, the user terminal may include a laptop computer, a desktop computer, a tablet personal computer (PC), a mobile terminal (for example, a smart phone and personal digital assistant (PDA)), a clock that can be attached or detached to or from a user's body, and a wearable terminal such as wearable glasses. Also, the user terminal may include all kinds of IoT devices, such as a robot cleaner and an air conditioner.

The user terminal may store an application to store and manage information about the user's purchase histories. Accordingly, the controller 170 may receive information about the user's purchase histories from the user terminal.

According to another example, the application may be stored in the database 173. In this case, the controller 170 may receive information about the user's purchase histories directly from the user, through the display unit 160 that is implemented as a touch screen type. According to another example, if the user purchases a goods item by clicking an icon displayed on the display unit 160, the controller 170 may collect a purchase history, and store the collected purchase history in the database 173.

The controller 170 may select a method of displaying icons, according to whether a process of collecting a purchase history has been performed. For example, FIG. 10 shows icons for goods items having no purchase histories, as described above. The controller 170 may display icons for goods items having no purchase histories by representing the outlines of the icons with dotted lines and displaying names of the goods items in the form of text, as shown in FIG. 10.

The controller 170 may differentiate a method of displaying icons for goods items having purchase histories from a method of displaying icons for goods items having no purchase histories. According to an embodiment, FIG. 11 shows icons for goods items having no purchase histories and an icon for a goods item having at least one purchase history.

Figure 11:
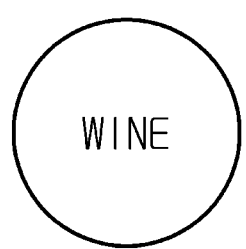
FIG. 11 illustrates icons for goods items having no purchase histories and an icon for a goods item having at least one purchase history according to various embodiments of the present disclosure.
Figure 11:
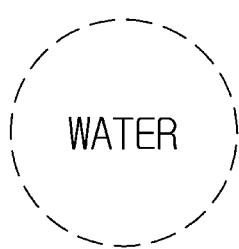
Figure 11:
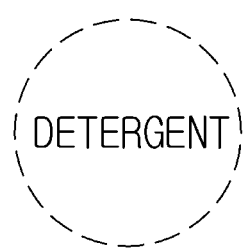

FIG. 11(*a*) shows an icon for a goods item having at least one purchase history, and FIGS. 11(*b*) and 11(*c*) show icons for goods items having no purchase histories. The controller 170 may represent the outline of the icon for the goods item having the at least one purchase history with a thick line, and also represent the name of the goods item in bold strokes.

However, the method of displaying the icons is not limited to this. For example, the controller 170 may differentiate the size of an icon for a goods item having a purchase history from the size of an icon for a goods item having no purchase history. According to another example, the controller 170 may differentiate the color of an icon for a goods item having a purchase history from the color of an icon for a goods item having no purchase history. Also, the controller 170 may include a representative image for a goods item having a purchase history in an icon.

Also, the controller 170 may set any other various methods of displaying icons so that a user can distinguish an icon for a goods item having a purchase history from an icon for a goods item having no purchase history.

Also, the controller 170 may set an arrangement of icons according to purchase histories. For example, the controller 170 may arrange an icon for a goods item having a purchase history, ahead of an icon for a goods item having no purchase history. For example, comparing FIG. 11 to FIG. 10, if the controller 170 collects a purchase history of wine, the controller 170 may change a display form of an icon for wine, and change an arrangement order of the icon for wine such that the icon for wine is positioned ahead of the other icons (see FIGS. 10(*c*) and 11(*a*)).

According to another example, the controller 170 may locate an icon for a goods item for which purchase histories have been collected the greater number of times, among icons for goods items having purchase histories, ahead of the other icons. According to another example, the controller 170 may locate an icon for goods item for which a purchase history has been collected lastly, ahead of the other icons.

Meanwhile, the controller 170 may collect purchase histories, and analyze the collected purchase histories to create purchase patterns. An algorithm or program for analyzing purchase histories to create purchase patterns may be stored in the database 173 or an external server. The purchase patterns may include information about the kinds of goods items that the user has purchased, the names of the goods items, the manufacturing companies of the goods items, the order quantities of the goods items, the purchasing cycles of the goods items, etc.

For example, the controller 170 may transfer information about the collected purchase histories to an external server through the communication unit 140. In this case, the controller 170 may receive purchase patterns analyzed and created by the external server through the communication unit.

The controller 170 may configure a user interface based on the purchase patterns so that the user can easily purchase the goods items, and display the user interface on the display unit 160. Meanwhile, if the external server configures a user interface according to the purchase patterns, the controller 170 may receive the user interface from the external server, and display the user interface on the display unit 160.

According to an embodiment, the controller 170 may differentiate an icon for a goods item for which a purchase pattern has been created from an icon for a goods items for which no purchase pattern has been created, on the display unit 160.

Figure 12:
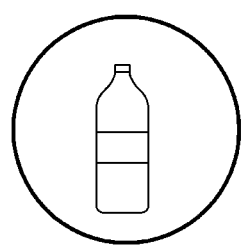
FIG. 12 illustrates icons for goods items for which purchase patterns have been created according to various embodiments of the present disclosure.
Figure 12:
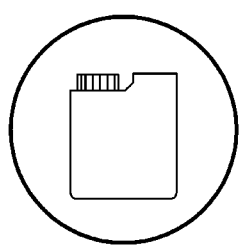
Figure 12:
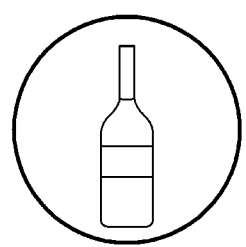

FIG. 12 shows icons for goods items for which purchase patterns have been created. The controller 170 may display icons including images of goods items, instead of text, differently from icons for goods items for which no purchase patterns have been created. Referring to FIG. 12, in the case of goods items for which purchase patterns have been created, the controller 170 may download images of the goods items through the communication unit 140, and display icons using the downloaded images. At this time, the controller 170 may include images of products that the user has actually purchased, in the icons, so that the user can intuitively understand the icons.

However, the controller 170 may differentiate an icon for a goods item for which a purchase pattern has been created from an icon for a goods item for which no purchase pattern has been created, using any other methods, as long as the user can feel a difference between the icon for the goods item for which the purchase pattern has been created and the icon for the goods item for which no purchase pattern has been created.

Meanwhile, the user may select at least one from among the icons displayed through the display unit 160. For example, if the display unit 160 is a touch screen type, the user may touch one of the icons displayed on the display unit 160.

The controller 170 may provide a purchasing service for a goods item corresponding to the selected icon. At this time, the controller 170 may perform a predetermined purchasing process according to whether the goods item has a purchase history and whether a purchase pattern for the goods item has been created. This operation will be described later.

Meanwhile, if the user makes payment, the controller 170 may collect the user's purchase history, and store the user's purchase history in the database 173. Then, the icon for the goods item that the user has purchased may be changed and displayed on the display unit 160, and the position of the icon may also be changed.

Meanwhile, the number of icons that are displayed on the screen of the display unit 160 may have been set in advance. For example, the number of icons may have been set when the refrigerator 1 was designed. Also, the user may himself or herself set the number of icons through an edit application.

Meanwhile, an icon for a purchased goods item or an icon for a goods item for which a purchasing cycle has elapsed among icons displayed in the user interface may be removed sequentially.

According to another example, the number of icons for goods items having no purchase histories, the number of icons for goods items having purchase histories, and the number of icons for goods items for which purchase patterns have been created may be respectively set in advance. According to another example, the number of icons for goods items having no purchase histories, the number of icons for goods items having purchase histories, and the number of icons for goods items for which purchase patterns have been created may be set proportionally.

Figure 13:
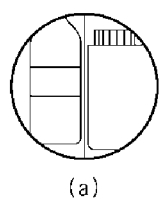
FIG. 13 illustrates an icon displayed by grouping a plurality of goods items for which purchase patterns have been created, and icons for individual goods items, according to various embodiments of the present disclosure.
Figure 13:
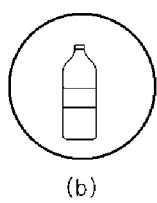
Figure 13:
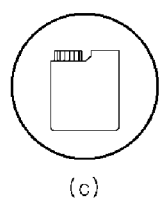
Figure 13:
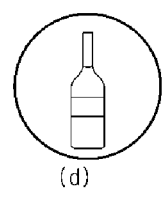
Figure 13:
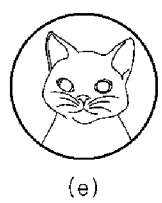

Meanwhile, a display pattern of icons is not limited to the above-described examples. For example, the controller 170 may group goods items having the same purchasing cycle, and display the goods items as a single icon. FIG. 13 shows an icon displayed by grouping a plurality of goods items for which purchase patterns have been created, and icons for individual goods items, according to an embodiment of the present disclosure.

If a service for purchasing a plurality of goods items at the same time is provided when expected dates of purchasing for the plurality of goods items are close to each other, a user can get convenience. Accordingly, the controller 170 may group a plurality of goods items for which expected dates of purchasing are close to each other to display the grouped goods items as a single icon, so as to enable a user to purchase the plurality of goods items at the same time by selecting the icon.

The controller 170 may include images of products having the user's purchase histories in the icon so that the user can intuitively recognize what goods items are grouped into the icon. For example, the controller 170 may create an icon including images of water and detergent, as shown in FIG. 13(*a*).

According to another example, the controller 170 may include an image capable of representing a plurality of goods items in an icon, if the plurality of goods items belong to the same or similar category. For example, if an expected date of purchasing for cat food and an expected date of purchasing for cat medicine are within a predetermined time period, the controller 170 may include a cat image in an icon.

Meanwhile, in FIG. 13, a case in which two goods items are grouped is shown, however, the present disclosure is not limited to this.

Figure 14:
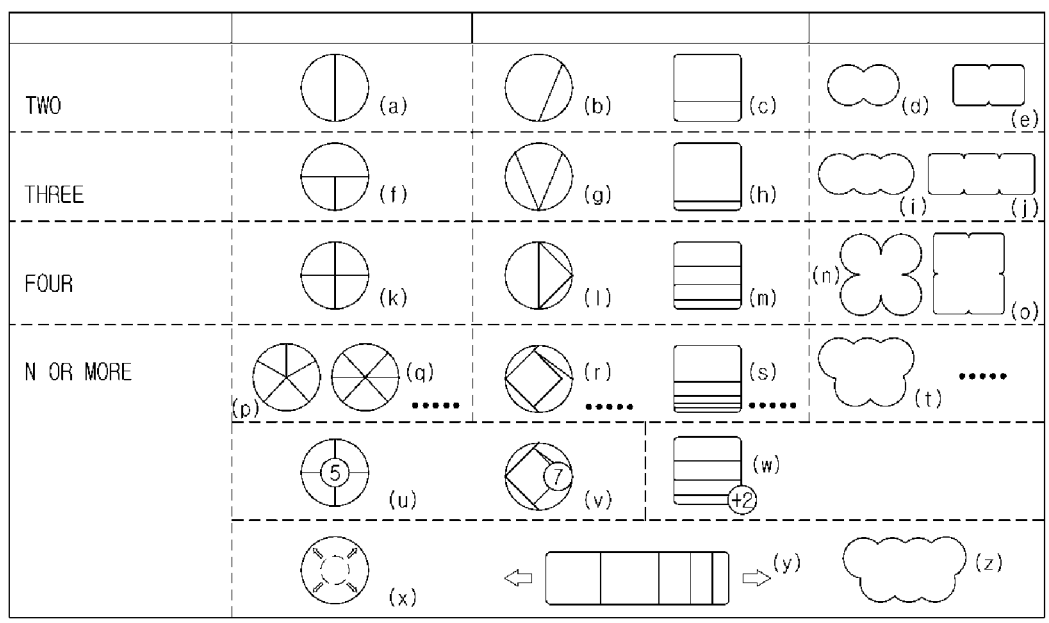
FIG. 14 illustrates a view for describing a method of grouping a plurality of goods items to display the plurality of goods items as an icon, according to various embodiments of the present disclosure.

FIG. 14 is a view for describing a method of grouping a plurality of goods items to display the plurality of goods items as an icon, according to an embodiment of the present disclosure.

FIGS. 14(*a*), 14(*b*), 14(*c*), 14(*d*), and 14(*e*) show icons that are created when two goods items are grouped. The icon may be divided into left and right areas of the same size, in each of which images of goods items are included, as shown in FIG. 14(*a*). Also, the icon may be divided into left and right areas of different sizes, in each of which images of goods items are included, as shown in FIGS. 14(*b*) and 14(*c*). In this case, the larger one of the divided areas may include an image of a goods item for which an expected date of purchasing is relatively imminent.

Also, icons may be displayed by other various methods as shown in FIGS. 14(*d*) and 14(*e*). Also, the left area of each icon may include an image of a goods item for which an expected date of purchasing is relatively imminent.

FIGS. 14(*f*), 14(*g*), 14(*h*), 14(*i*), and 14(*j*) show icons that are created when three goods items are grouped. The controller 170 may create an icon divided into three areas of different sizes to display an image of a goods item in each area. For example, the controller 170 may display an icon divided into three areas to display an image of a goods item for which an expected date of purchasing is most imminent, in the upper area, as shown in FIG. 14(*f*).

Also, the controller 170 may divide an icon into several areas, as shown in FIGS. 14(*g*) and 14(*h*), and include images of goods items for which expected dates of purchasing are imminent, in the respective areas, in the order of sizes of the areas. Also, the controller 170 may configure icons in other various shapes, as shown in FIGS. 14(*i*) and 14(*j*). In this case, the controller 170 may locate an image of a goods item for which an expected date of purchasing is more imminent, in the left area of the corresponding icon.

Meanwhile, FIGS. 14(*k*), 14(*l*), 14(*m*), 14(*n*), and 14(*o*) show icons that are created when four goods items are grouped. The controller 170 may create an icon divided into four areas of the same size to display an image of a goods item in each area, as shown in FIG. 14(*k*). Also, the controller 170 may create icons divided into four areas of different sizes to include an image of a goods item in each area, as shown in FIGS. 14(*l*), 14(*m*), 14(*n*), and 14(*o*). The controller 170 may locate an image of goods items starting from the leftmost area, in the order of the sizes of the divided areas.

Also, the controller 170 may include images of goods items in various shapes of icons, as shown in FIGS. 14(*n*) and 14(*o*). For example, if one of icons displayed on the display unit 160 is selected by a user, the controller 170 may provide a purchasing service for a goods item corresponding to the selected icon.

Goods items that can be included in the icons are not limited to the above-mentioned examples. For example, FIGS. 14(p), 14(q), 14(r), 14(s), and 14(t) show icons each including a N number of goods items or more (N≥5). The controller 170 can group any number of goods items into one icon as long as the goods items can be identified.

For example, the controller 170 may display images of some goods items of the grouped goods items, and display the number of the remaining goods items in the form of text. According to an embodiment, the controller 170 may create, as shown in FIG. 14(u), an icon divided into five areas, wherein four areas include images of goods items and the remaining one area displays a number "5" indicating that five goods items are grouped. Also, the controller 170 may create, as shown in FIG. 14(v), an icon divided into six areas, wherein five areas include images of goods items, and the remaining one area displays a number "7" indicating that seven goods items are grouped, without displaying images of two goods items.

Also, the controller 170 may represent an additional goods item in the form of text, other than goods items including images. The controller 170 may create, as shown in FIG. 14(w), an icon divided into four areas, wherein the four areas include images of goods items, and text indicating that there are two additional goods items is displayed.

Meanwhile, the controller 170 may create an icon to allow the user to increase its size to display images of a plurality of goods items, or an icon to allow the user to drag it to see images of a plurality of goods items, so that the user can easily see images of various goods items.

For example, the controller 170 may create, as shown in FIG. 14(x), an icon to allow the user to pinch zoom out it in various directions by touching it to enlarge the size, so that the user can see images of goods items in detail.

According to another example, the controller 170 may create, as shown in FIG. 14(y), an icon to allow the user to pinch zoom out it in horizontal and vertical directions so that the user can see images of goods items. According to another example, the controller 170 may create, as shown in FIG. 14(z), various shapes of icons having sizes decided according to the numbers of goods items. Hereinafter, the case in which expected dates of purchasing for a plurality of goods items are close to each other will be described in detail.

Figure 15:
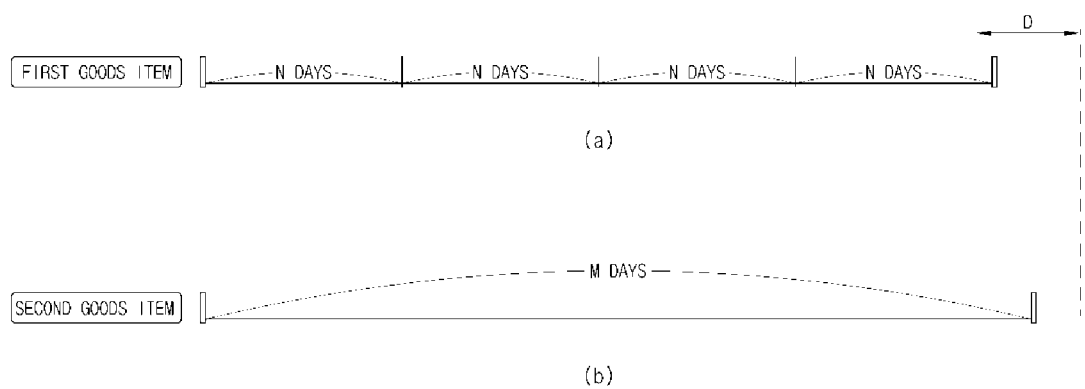
FIG. 15 illustrates a view for describing the case in which expected dates of purchasing for a plurality of goods items are close to each other, according to various embodiments of the present disclosure.

FIG. 15 is a view for describing the case in which expected dates of purchasing for a plurality of goods items are close to each other, according to an embodiment of the present disclosure.

An expected date of purchasing may be a date at which a purchasing cycle elapses from when a user purchased a goods item or when a user was delivered a goods item. For example, if a user was delivered a goods item on Feb. 5, 2015, and a purchasing cycle for the goods item is 5 days, the next expected date of purchasing for the goods item may be Feb. 10, 2015.

Referring to FIG. 15, a purchasing cycle of a first goods item is N days, and a purchasing cycle of a second goods item is M days (M≠N), wherein the purchasing cycles are derived through analysis of purchasing patterns. For example, a fourth expected date of purchasing for the first goods item and a first expected date of purchasing for the second goods item may be the 28th date and the 30th date, respectively. As such, if a difference between expected dates of purchasing for certain goods items is within two days, the goods items may be grouped and displayed as an icon.

That is, although a plurality of goods items have different purchasing cycles, expected dates of purchasing of the goods items may be close to a specific date. Accordingly, if a difference between expected dates of purchasing for the first goods item and the second goods item is within a predetermined period D, the controller 179 may group the first goods item and the second goods item for the predetermined period D and display them as an icon. Also, if the first and second goods items are purchased in the predetermined period D, the controller 170 may separate the goods items to create an icon for the first goods item and an icon for the second goods item, individually. However, if the first and second goods items are not purchased in the predetermined period D, the controller 170 may separate, when the predetermined period D elapses, the goods items to create an icon for the first goods item and an icon for the second goods item, individually.

Hereinafter, a method of providing a purchasing service according to whether a purchase history has been collected and whether a purchase pattern has been created will be described.

Figure 16:
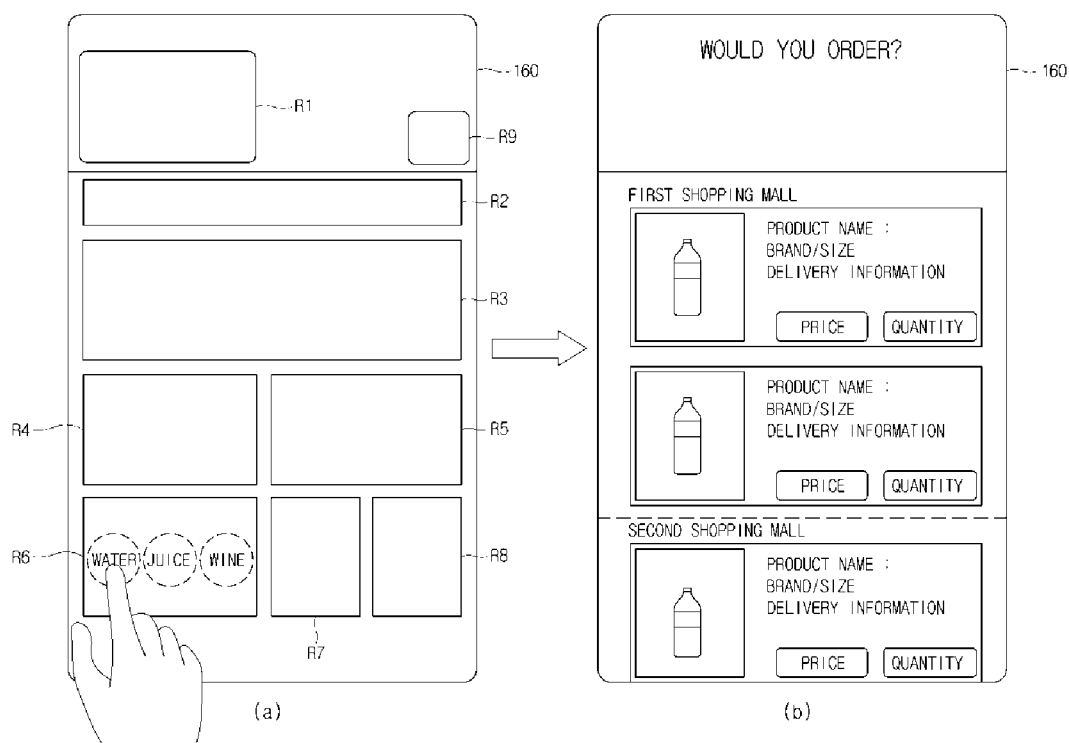
FIG. 16 illustrates a view for describing a purchasing process for a goods item having no purchase history according to various embodiments of the present disclosure.

FIG. 16 is a view for describing a purchasing process for a goods item having no purchase history.

If certain goods items have no purchase histories, the controller 170 may display icons of the goods items in the sixth region R6 of the display unit 160 such that the names of the goods items are displayed as text and the outlines of the icons are represented with dotted lines, as shown in FIG. 16(a). If a user touches one of the plurality of icons displayed on the display unit 160, the controller 170 may display a product list for a goods item corresponding to the selected icon.

For example, if the goods item corresponds to water, the controller 170 may display a list of water products that manufacturing companies sell. As shown in FIG. 16(b), the controller 170 may display information about products that individual shopping malls sell. The information about the products may include information about manufacturing companies or brands that manufactures the products, information about the sizes of the products, information about whether the prices of the products include delivery fees, information about the prices of the products, etc.

Accordingly, the controller 170 may enable the user to select his or her desired product and a purchasing quantity of the product. For example, the controller 170 may display an interface including an icon or a button to enable the user to input a quantity, thus inducing the user's selection.

Thereby, the controller 170 according to an embodiment may prevent the user's inconvenience that may be caused if the controller 170 induces the user to purchase a specific product when the user has no purchase history for the specific product.

If the controller 170 receives information about a product, an on-line shopping mall, and a purchasing quantity from the user, the controller 170 may provide a payment service. The payment service may be implemented by various methods well-known in the art.

Figure 17:
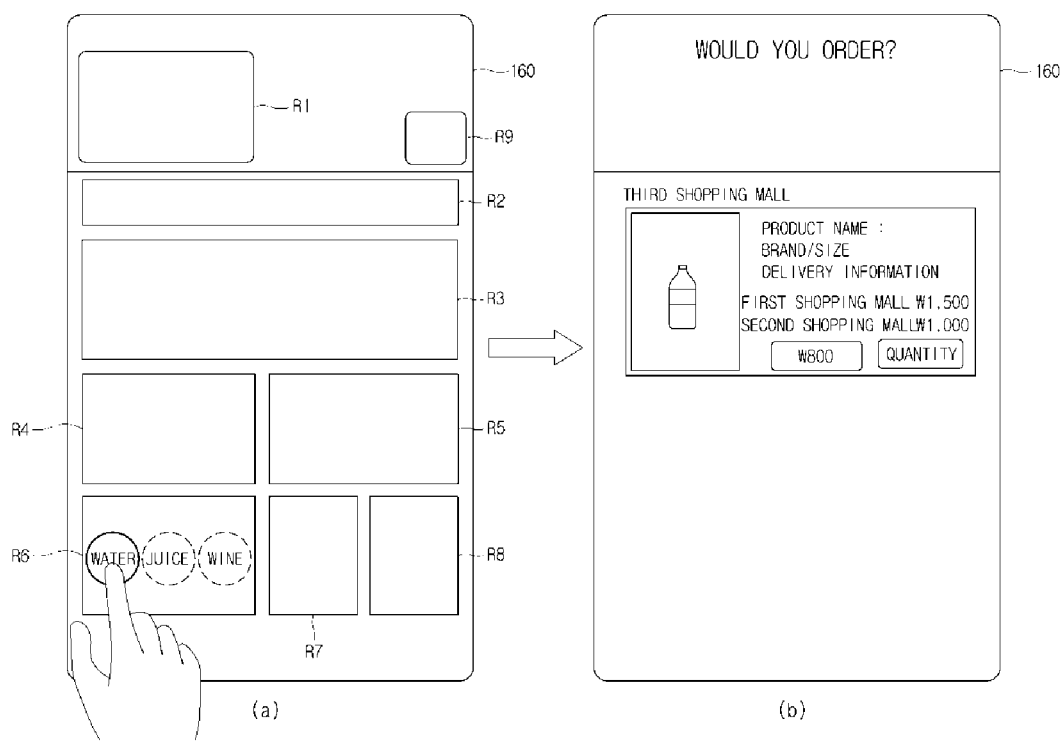
FIG. 17 illustrates a view for describing a purchasing process for a goods item for which a purchase history has been collected, according to various embodiments of the present disclosure.

Meanwhile, if the user makes payment, the controller 170 may collect the user's purchase history, and store the user's purchase history in the database 173. Accordingly, an icon for the goods item purchased by the user may be changed and first arranged in order, as shown in FIG. 17.

Meanwhile, the number of icons included in the user interface may have been set in advance by a designer of the refrigerator 1. For example, the number of icons may be respectively set for icons having no purchase histories, icons having purchase histories, and icons for which purchase patterns have been created.

According to another example, the number of icons for icons having no purchase histories, icons having purchase histories, and icons for which purchase patterns have been created may be set proportionally.

Meanwhile, an icon for a purchased goods item or an icon for a goods item for which a purchasing cycle has elapsed among icons displayed in the user interface may be removed sequentially. Also, as shown in a tenth area S10 of FIG. 9, a button for enabling a user to change a setting for the number of icons for goods items may be displayed on the display unit 160. Accordingly, the user may click or touch the button to set the number of icons.

Also, the controller 170 may receive delivery information through the communication unit 140. For example, the controller 170 may receive delivery information from a server of a shopping mall at which the user purchased goods items, or a server of a delivery company connected to the shopping mall, through the communication unit 140. The delivery information may include information about delivery states of the goods items ordered by the user.

Accordingly, the controller 170 may set a starting date for calculating the next expected date of purchasing, based on the delivery information. Also, the controller 170 may display the delivery information as an icon so that the user can intuitively recognize the delivery information. Detailed descriptions about this operation will be given later.

FIG. 17 is a view for describing a purchasing process for a goods item for which a purchase history has been collected, according to an embodiment of the present disclosure.

If a certain goods item has a purchase history, the controller 170 may change a method of displaying an icon, as shown in FIG. 17(a). More specifically, if a user purchases water through the above-described method, the controller 170 may change the outline of an icon for water to a bold line, thereby differentiating the icon for water from other icons for goods items having no purchase histories.

If the user touches one of icons displayed on the display unit 160, the controller 170 may display a product list for a goods item corresponding to the icon. For example, if the user selects an icon for water, the controller 170 may display information about a water product(s) that the user has ever purchased, according to a purchase history for water.

That is, by displaying only information about a product-of-interest on the display unit 160, the controller 170 can provide a service of enabling the user to purchase a product more conveniently. As such, the controller 170 may simplify a purchasing process to thereby increase the user's convenience. For example, the controller 170 may provide price information for individual shopping malls with respect to a product that the user has ever purchased, which is shown in FIG. 17(b). In this case, the user may compare prices for a goods item-of-interest between shopping malls to purchase the goods item.

Generally, users tend to search for the lowest price with respect to a goods item that they purchase periodically, though putting time and effort. Accordingly, the controller 170 according to an embodiment may display an icon for a goods item that the user has actually purchased, on the display unit 160, so that the user can purchase the goods item more conveniently, and also the controller 170 may provide price information about the goods item so that the user can compare prices to purchase the goods item, thereby providing a service meeting the user's needs.

Meanwhile, if purchase histories for a certain goods item are collected N times or more (N≥2), the controller 170 may analyze the collected purchase histories to create a purchase pattern. Hereinafter, a purchasing process for a goods item for which a purchase pattern has been created will be described.

Figure 18:
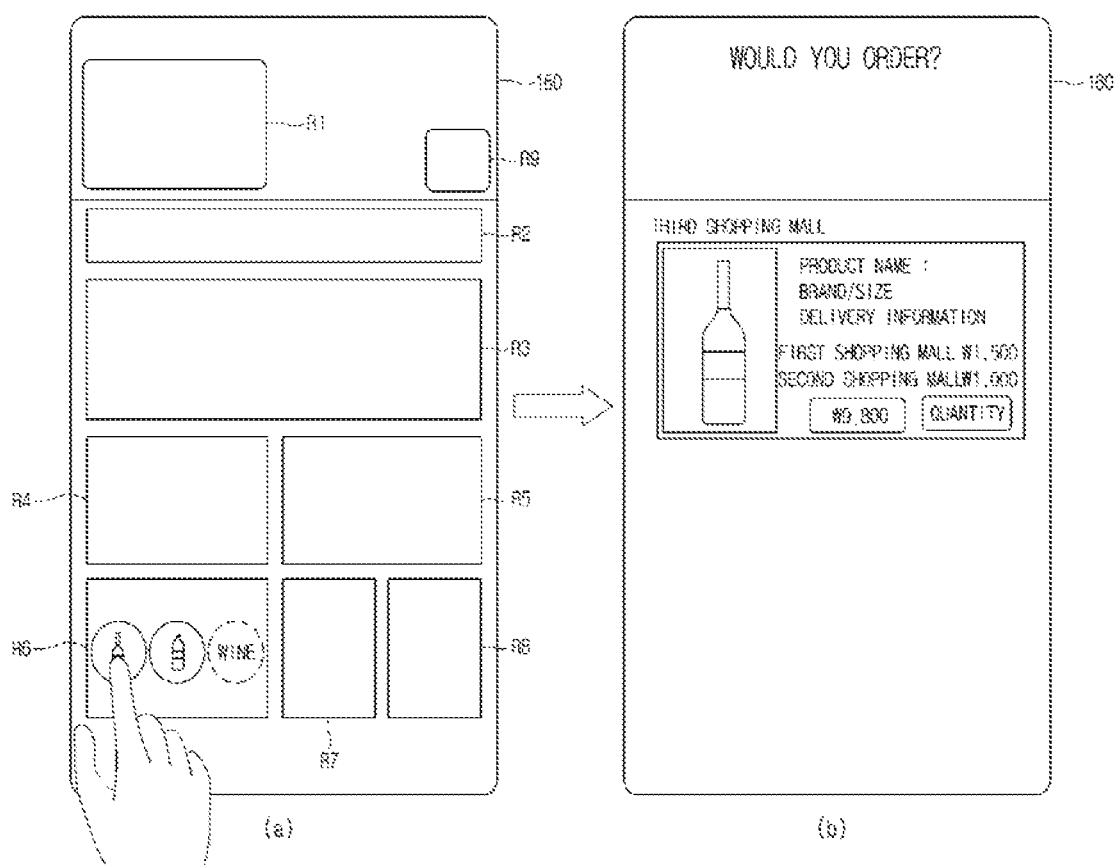
FIG. 18 illustrates a view for describing a purchasing process for a goods item for which a purchase pattern has been created according to various embodiments of the present disclosure.

FIG. 18 is a view for describing a purchasing process for a goods item for which a purchase pattern has been created.

The controller 170 may set a different method of displaying an icon with respect to a goods item for which a purchase pattern has been created. For example, the controller 170 may display an icon including a product image in the sixth region R6, which is shown in FIG. 18(a).

If a user touches an icon displayed on the display unit 160, the controller 170 may display a product list for a goods item corresponding to the icon. For example, if the user selects an icon for water, the controller 170 may display information about a product that he or she has previously purchased. At this time, the controller 170 may display a predetermined button to enable the user to select a quantity of the product, according to an average quantity of the product that the user has previously purchased, which is shown in FIG. 18(b).

That is, the controller 170 according to an embodiment may set various information for the user to need to input when purchasing a product, such as a product name, a purchasing quantity, etc., according to the user's purchase pattern, so that the user can purchase the product more conveniently. In other words, the controller 170 according to an embodiment may provide an inertial purchasing user interface for simplifying a user's purchasing process, based on the results of analysis on the user's purchase histories, while providing a customized service for the user by storing information for the user to need to input when purchasing a goods item in advance.

Meanwhile, as described above, the controller 170 may group a plurality of goods items for which expected dates of purchasing are close to each other to display the grouped goods items as a single icon.

Figure 19:
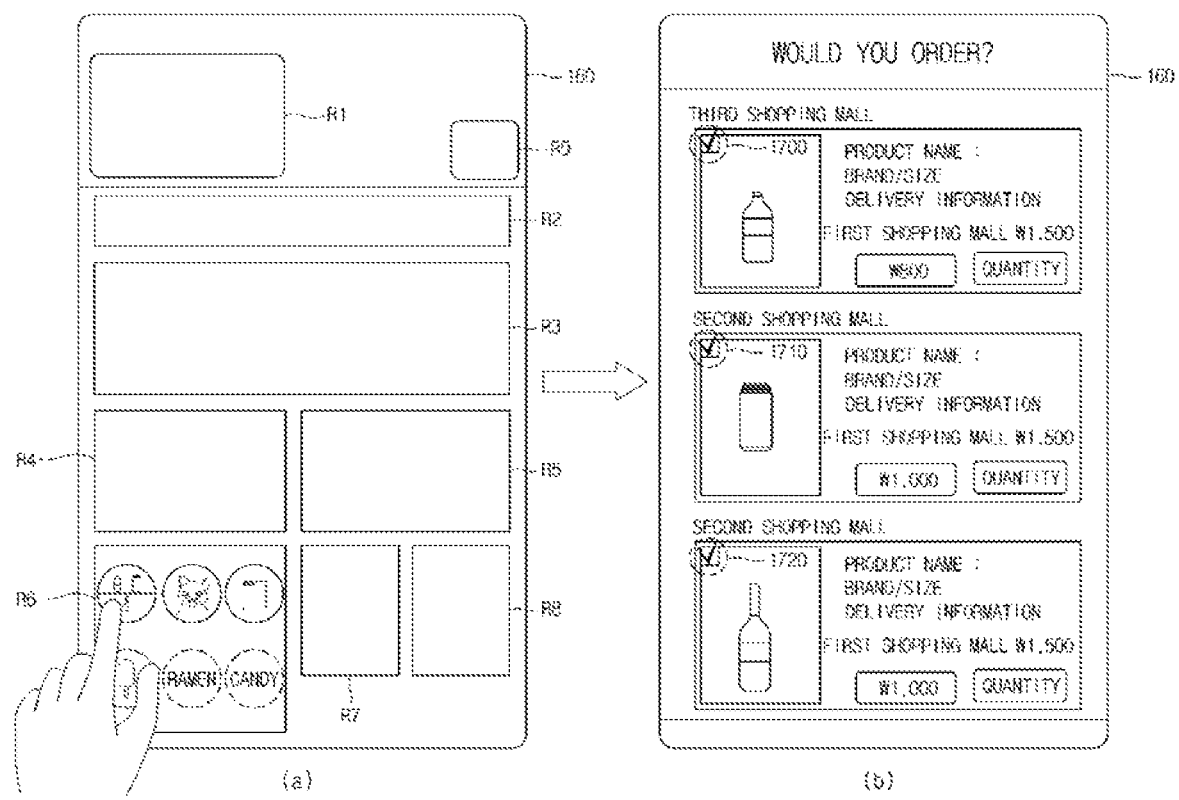
FIG. 19 illustrates a view for describing a process of simultaneously purchasing a plurality of goods items for which expected dates of purchasing are close to each other, according to various embodiments of the present disclosure.

FIG. 19 is a view for describing a process of simultaneously purchasing a plurality of goods items for which expected dates of purchasing are close to each other, according to an embodiment of the present disclosure.

The controller 170 may display an icon into which a plurality of goods items are grouped in the sixth region R6 on the display unit 160, as shown in FIG. 19(a). If a user touches the icon displayed on the display unit 160, the controller 170 may display information about a plurality of products grouped into the icon, as shown in FIG. 19(b).

At this time, the controller 170 may create a user interface in which a plurality of buttons 1700, 1710, and 1720 for enabling the user to select a desired product from among the plurality of products are arranged, and display the user interface on the display unit 160. Accordingly, the user may purchase all of the plurality of products or selectively purchase some of the plurality of products.

Meanwhile, when an expected date of purchasing for a certain goods item approaches, the controller 170 may change a method of displaying an icon for the goods item, and an arrangement order of the goods item, while displaying a pop-up message. For example, the controller 170 may implement a user interface to display a pop-up message in a predetermined region of the screen of the display unit 160, when an expected date of purchasing for a certain goods item approaches.

Figure 20:
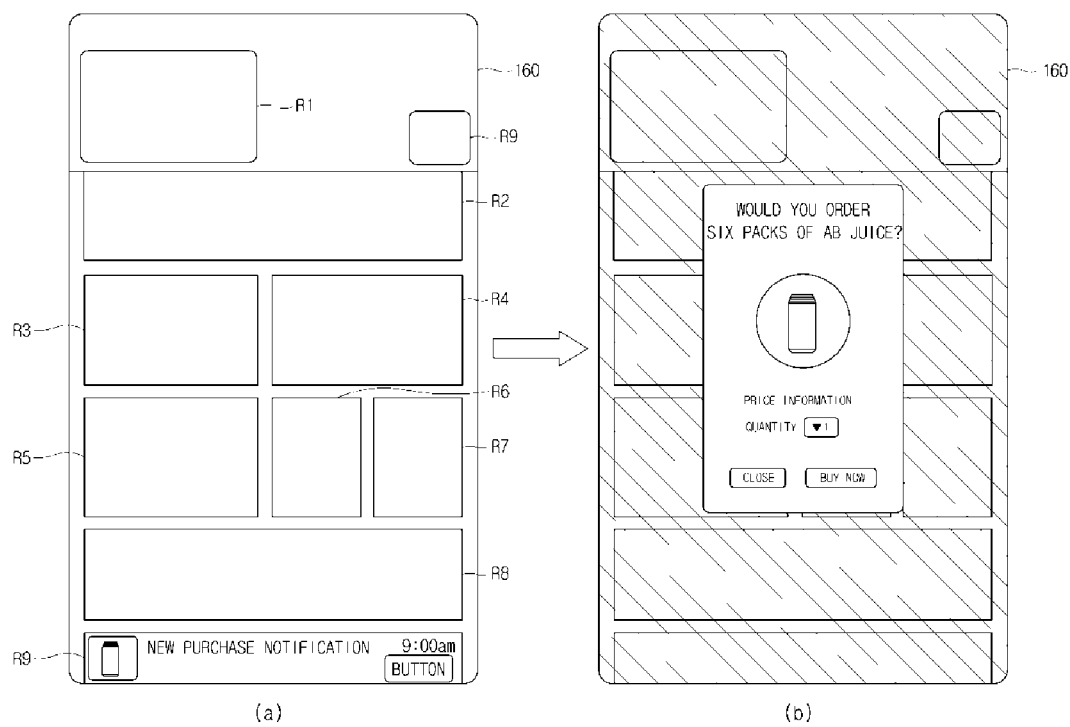
FIG. 20 illustrates a view for describing a purchasing process of giving a purchase notice through a pop-up message according to various embodiments of the present disclosure.

According to an embodiment, FIG. 20 is a view for describing a purchasing process of giving a purchase notice through a pop-up message.

The controller 170 may display a pop-up message in the lower area (that is, a ninth region R9) of the display unit 160, as shown in FIG. 20(*a*). Accordingly, a user can easily recognize that the corresponding goods item needs to be purchased.

Also, if the user clicks or flicks the ninth region R9 in which the pop-up message is displayed on the display unit 160, the controller 170 may display an interface as shown in FIG. 20(*b*), in addition to an interface as shown in FIG. 18(*b*), on the display unit 160. That is, a user interface for providing a product purchasing service may be implemented by various methods.

According to another example, if no purchase request for a goods item for which an expected date of purchasing approaches, the goods item determined based on the user's purchase pattern, is received from the user, the controller 170 may inform the user's terminal or an IoT device that the goods item needs to be purchased, through the communication unit 140.

According to an embodiment, if no purchase request for a goods item for which an expected date of purchasing is within a predetermined period is received from the user, the controller 170 may transfer a purchase request message to the user's terminal or an IoT device through the communication unit 140. Herein, the predetermined period may be set by the user, or may have been set when the refrigerator 1 was designed and then stored in the memory 175.

At this time, the controller 170 may transfer content related to a purchase request through one of various kinds of messages, such as a Short Message Service (SMS) message, a Multimedia Message Service (MMS) message, an instant message, or the like.

The purchase request message may include information about the goods item, such as the name of the goods item, an image of the goods item, or the brand or manufacturing name of the goods item, and the expected date of purchasing of the goods item. Also, the purchase request message may include various information related to the goods item, such as price information of on-line shopping malls with respect to the goods item, delivery information, and the like, so that the user can easily decide whether to purchase the goods item.

Also, the controller 170 may include Uniform Resource Locators (URLs) of payment pages of on-line shopping malls in the purchase request message so that the user can purchase the goods item without delay.

According to another example, when the expected date of purchasing for the goods item approaches, the controller 170 may change a configuration of a user interface that is displayed on the display unit 160.

Figure 21:
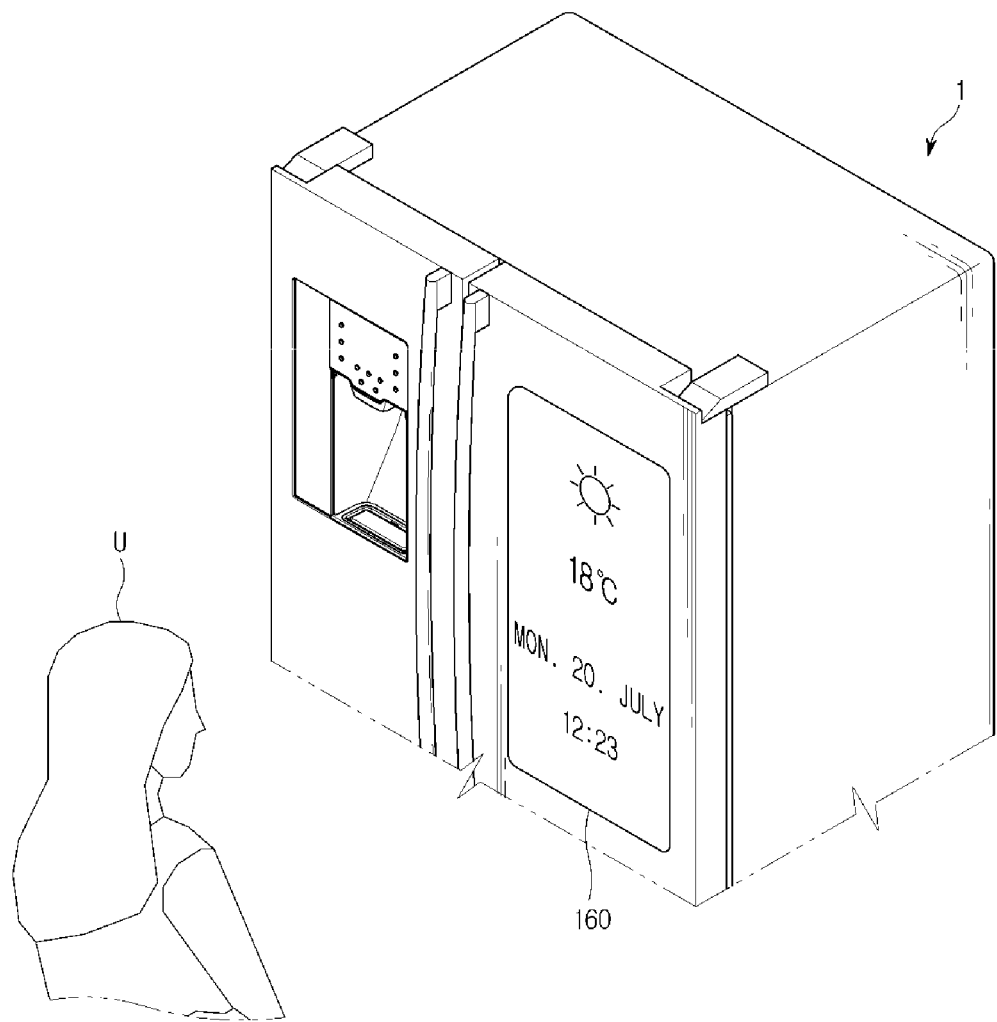
FIG. 21 and FIG. 22 illustrate a view for describing a case to change a user interface based on a distance, according to various embodiments of the present disclosure.
Figure 22:
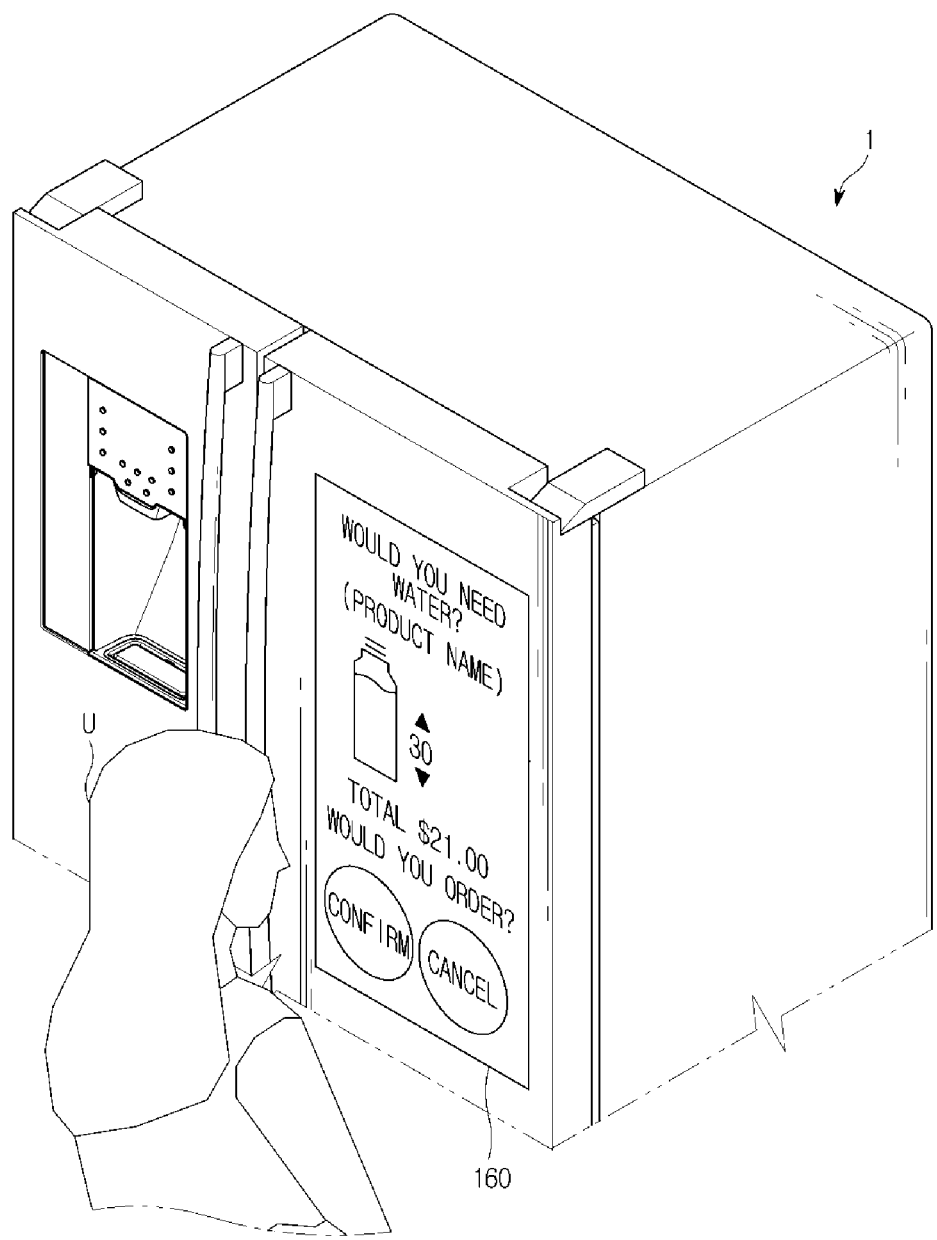

FIGS. 21 and 22 are views for describing user interfaces that are displayed on the display unit 160 according to distances to a user, according to different embodiments of the present disclosure.

Referring to FIG. 21, if a distance to a user U measured by the proximity sensor 150 is longer than a predetermined distance, or if no user is detected by the proximity sensor 150, the controller 170 may receive the result of the measurement by the proximity sensor 150, and display a user interface as shown in FIG. 21, on the display unit 160.

Meanwhile, if a distance to a user U measured by the proximity sensor 150 is equal to or shorter than a predetermined distance, the controller 170 may receive the result of the measurement from the proximity sensor 150, and display a user interface as shown in FIG. 22, on the display unit 160.

That is, the controller 170 may configure a user interface to inform the user U that a goods item needs to be purchased and to enable the user to purchase the goods item, and display the user interface on the display unit 160. Accordingly, if the user clicks a Confirm button or transfers a purchase command in a voice, the controller 170 may provide a payment service.

Meanwhile, if the user U clicks a Cancel button displayed on the display unit 160 or transfers a cancel command in a voice, the controller 170 may change the screen of the display unit 160 to display a user interface as shown in FIG. 5 on the display unit 160.

For example, the controller 170 may connect to a server of a shopping mall at which the user U has previously purchased the goods item or to a server of a delivery company connected to the shopping mall to receive delivery information. Accordingly, the controller 170 may display an icon configured to make the user U intuitively know a current delivery state.

Figure 23:
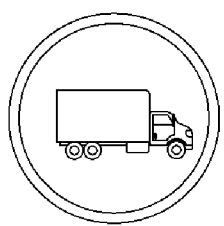
FIG. 23 illustrates icons including delivery information according to an embodiment of the present disclosure.
Figure 23:
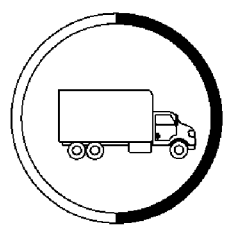
Figure 23:
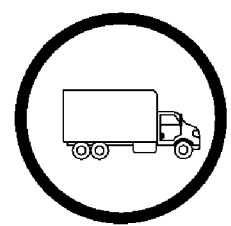

FIG. 23 shows icons including delivery information according to an embodiment of the present disclosure.

The controller 170 may display an icon including an image of a delivery truck and configured to make a user intuitively know a delivery state through a progress bar, as shown in FIG. 23.

FIG. 23(*a*) shows an image displayed when an order is completed. The controller 170 may create an icon configured to make a user recognize that delivery starts, as shown in FIG. 23(*a*). Also, the controller 170 may display a product name in the form of text below the icon so that the user can know what product is being delivered.

FIG. 23(*b*) shows an icon displayed during delivery. The controller 170 may display an icon configured to inform what days will be consumed until delivery completion, and to make a user intuitively recognize a current delivery state through a progress bar.

FIG. 23(*c*) shows an icon displayed at an expected date of delivery completion. The controller 170 may create an icon configured to inform a user that today is an expected delivery date of his or her ordered goods item, and to make the user intuitively know a current delivery state through a progress bar.

The controller 170 may receive delivery information through the communication unit 140, and display an icon based on the delivery information, as described above, such that the user can intuitively know a delivery state. In this way, the controller 170 according to an embodiment may make a user intuitively know a delivery state through the display unit 160, so that the user does not need to access a web server to trace delivery, thereby increasing user convenience.

Figure 24:
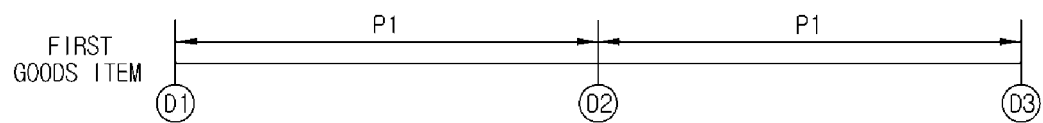
FIG. 24 illustrates a view for describing a case in which an expected date of purchasing according to a purchasing cycle changes according to delivery information, according to various embodiments of the present disclosure.
Figure 24:
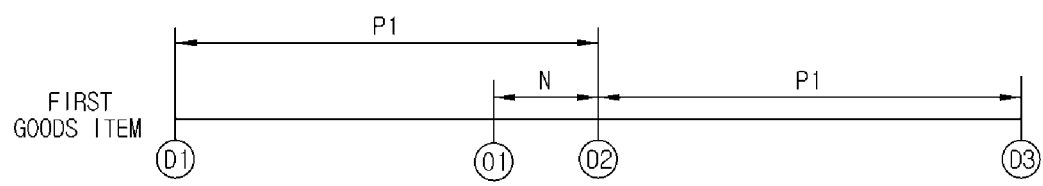
Figure 24:
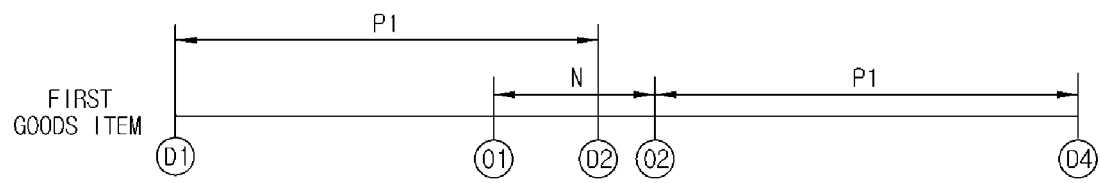

FIG. 24 is a view for describing a case in which an expected date of purchasing according to a purchasing cycle changes according to delivery information, according to an embodiment of the present disclosure.

If a purchase pattern is created, the controller 170 may set an expected date of purchasing according to a purchasing cycle. For example, the controller 170 may analyze a purchase pattern of water to obtain a purchasing cycle of five days. In this case, if a last date at which a user has purchased water is May 3, 2015, the controller 170 may set a first expected date of purchasing to May 8, 2015, and a second expected date of purchasing to May 13, 2015. That is, the controller 170 may add a purchasing cycle to a starting date, such as the last date of purchasing or a delivery date of a goods item, to set an expected date of purchasing.

FIG. 24(*a*) shows expected dates of purchasing according to a purchasing cycle. In FIG. 24(*a*), a purchasing cycle for a first goods item is P1, a first expected date of purchasing is D1, a second expected date of purchasing is D2, and a third expected date of purchasing is D3.

For example, the controller 170 may analyze a user's purchase pattern to determine that the user purchases water every five days. If a purchase pattern is created, the controller 170 may set a date of when five days elapse from the last date at which the user purchases water, to a N-th expected date of purchasing (N≥1).

For example, 20 bottles of water may need to be purchased every five days. In this case, if four days elapses after a user purchases water, and then the user again purchases water and stores the water after six days, the controller 170 may need to add five days to a date at which the water is stored, in order to accurately calculate the next expected date of purchasing. That is, the controller 170 may need to determine a starting date accurately although knowing a purchasing cycle, in order to induce a user's inertial purchasing accurately. Also, since a delivery time is consumed, there may occur a situation in which the user runs out of water due to the delivery time although the user purchases water on the fifth day.

Therefore, the controller 170 may inform the user that the corresponding goods item needs to be purchased before the expected date of purchasing in order to prevent a situation in which the goods item needed by the user does not remain in the refrigerator 1.

Accordingly, the controller 170 may inform the user that the goods item needs to be purchased N days before the second expected date d2 of purchasing, as shown in FIG. 24(*b*). At this time, the controller 170 may transfer a purchase request to the user, by various methods, such as changing a user interface that is displayed when the user approaches the refrigerator 1, displaying a pop-up message, or changing a method of displaying an icon.

According to the purchase request, the user may purchase the goods item. At this time, the controller 170 may adjust the next expected date of purchasing in consideration of a delivery state, in such a way to maintain the next expected date of purchasing if the goods item arrives before the expected date of purchasing or to adjust the next expected date of purchasing if delivery of the goods item is delayed.

FIG. 24(*c*) is a view for describing a case in which delivery of a goods item is delayed from an expected date of purchasing. For example, if a goods item is not purchased until an expected date of purchasing for the goods item elapses, the controller 170 may continue to inform a user that the goods item needs to be purchased, by the above-described method. That is, N days for which a purchase request is transferred is not limited to a predetermined period before an expected date of purchasing.

If a goods item purchased by a user is delivered later than an expected date of purchasing, for example, if a second delivery date 02 passes the second expected date D2 of purchasing, as shown in FIG. 24(*c*), the controller 170 may set a date of when the purchasing period P1 elapses from the second delivery date 02, to a third expected date D4 of purchasing.

Meanwhile, the user may purchase goods items using various methods. For example, the user may purchase goods items through the refrigerator 1, or may visit a shopping mall to purchase goods items. Also, the user may purchase goods items through another IoT device except for the refrigerator 1.

Accordingly, the controller 170 may determine whether the user has purchased a goods item based on delivery information, as described above, and also determine whether the user has purchased a goods item based on purchasing information.

However, there may occur a situation in which the user cannot check purchase information. For example, if the user visits a shopping mall to purchase a goods item and then puts the goods item in the refrigerator 1, the controller 170 may check purchasing of the goods item from identification information acquired through the image acquiring unit 130. However, there are cases in which the user stores a goods item at a location at which the controller 170 cannot acquire identification information of the goods item through the image acquiring unit 130, or in which the controller 170 cannot acquire identification information of a goods item due to other goods items. Accordingly, if no purchase information is received for a predetermined period, the controller 170 may maintain the next expected date of purchasing. That is, the controller 170 may determine that it cannot check a goods item purchased by the user, so as not to change the next expected date of purchasing.

Figure 25:
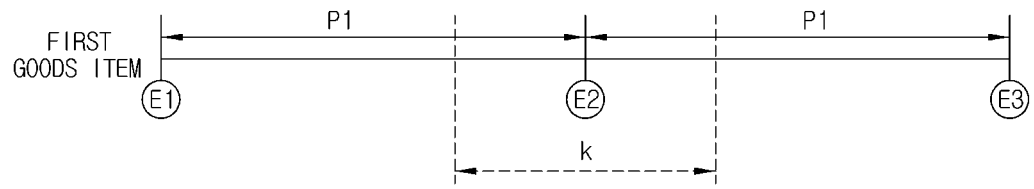
FIG. 25 illustrates a view for describing a method of setting the next expected date of purchasing according to whether purchase information of a goods item is received according to various embodiments of the present disclosure.
Figure 25:
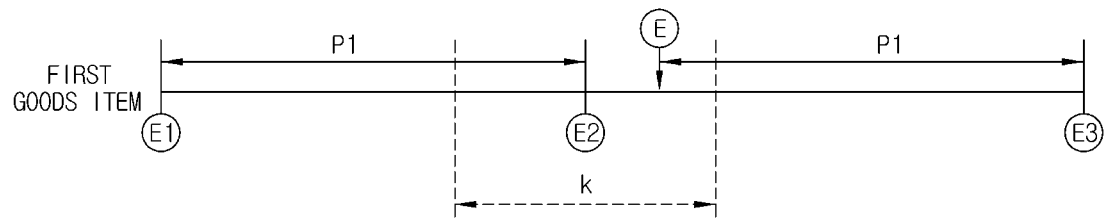

FIG. 25 is a view for describing a method of setting the next expected date of purchasing according to whether purchase information of a goods item is received.

Referring to FIG. 25(*a*), a first expected date of purchasing for a first goods item is E1, a second expected date of purchasing for the first goods item is E2, and a third expected date of purchasing for the first goods item is E3. Also, a purchasing cycle of the first goods item is P1. If the controller 170 determines that no purchase information is received for a predetermined period k around the second expected date E2 of purchasing, the controller 170 may maintain the third expected date E3 of purchasing as it is. Herein, the predetermined period k may be set by the designer of the refrigerator 1 or by the user. Or, the predetermined period k may be set to a longer period for a goods item having a longer purchasing cycle.

For example, if a purchasing cycle of the first goods item is 30 days, the first goods item may be not a frequently purchased goods item since it is purchased in bulk. Accordingly, the controller 170 may set a long time for which it determines whether purchase information is received, with respect to a goods item having a long purchase period.

Meanwhile, if purchase information is received within the predetermined period k, the controller 170 may use a date at which the purchase information is received, that is, a date at which the user purchases the goods item or at which the goods item is delivered, as a starting date, to calculate the next expected date of purchasing. For example, as shown in FIG. 25(*b*), if purchase information is received within the predetermined period k, and a date E at which the purchase information is received elapses from the second expected date E2 of purchasing, the controller 170 may calculate a date at which the purchase period k elapses starting from the date E at which the purchase information is received, as the next expected date of purchasing.

Meanwhile, if expected dates of purchasing for a plurality of goods items overlap within a predetermined period, the controller 170 may group the goods items to display them as a single icon.

Figure 26:
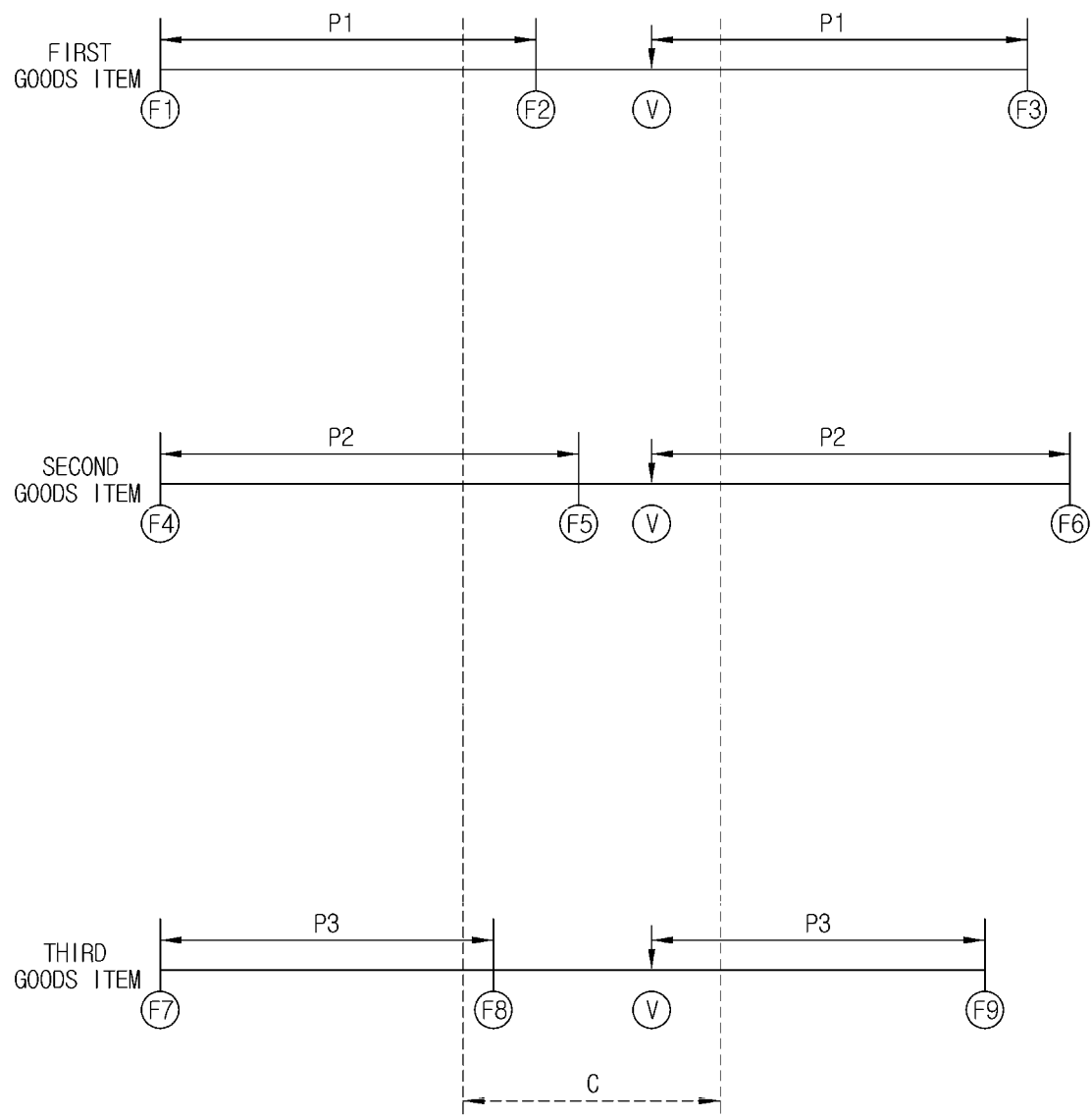
FIG. 26 illustrates a view for describing operation when expected dates of purchasing are close to each other, according to various embodiments of the present disclosure.

FIG. 26 is a view for describing operation when expected dates of purchasing are close to each other, according to an embodiment of the present disclosure.

Referring to FIG. 26, a first expected date of purchasing for a first goods item is F1, a second expected date of purchasing for the first goods item is F2, a third expected date of purchasing for the first goods item is F3, and a purchase period is P1. Also, a first expected date of purchasing for a second goods item is F4, a second expected date of purchasing for the second goods item is F5, a third expected date of purchasing for the second goods item is F6, and a purchase period is P2. Also, a first expected date of purchasing for a third goods item is F7, a second expected date of purchasing for the third goods item is F8, a third expected date of purchasing for the third goods item is F9, and a purchase period is P3.

Herein, the purchase periods P1, P2, and P3 of the first, second, and third goods items may be different from each other. However, the expected dates of purchasing for the first, second, and third goods items may be close to a specific date.

For example, if the expected dates of purchasing for the first, second, and third goods items are close to each other within a predetermined period c, as shown in FIG. 26, the controller 170 may display the first, second, and third goods items as a single icon. A method of displaying an icon with respect to a plurality of goods items have been described above, and accordingly, a further description thereof will be omitted.

Meanwhile, if a user clicks the icon, the controller 170 may display a user interface for enabling the user to purchase the plurality of goods items included in the icon at the same time, on the display unit 160. Detailed descriptions thereof have been described above, and accordingly, a further description thereof will be omitted.

If a plurality of goods items are purchased at the same time, actual dates of purchasing for the goods items may become the same. Accordingly, the controller 170 may calculate the next expected dates of purchasing for the individual goods items, based on the actual date of purchasing for the goods items.

As shown in FIG. 26, the user may purchase the first, second, and third goods items at the same date V after expected dates F2, F5, and F8 of purchasing for the first, second, and third goods items elapse. Accordingly, the controller 170 may calculate the next expected dates of purchasing for the first, second, and third goods items according to the individual purchase periods for the first, second, and third goods items, starting from the date V.

Figure 27:
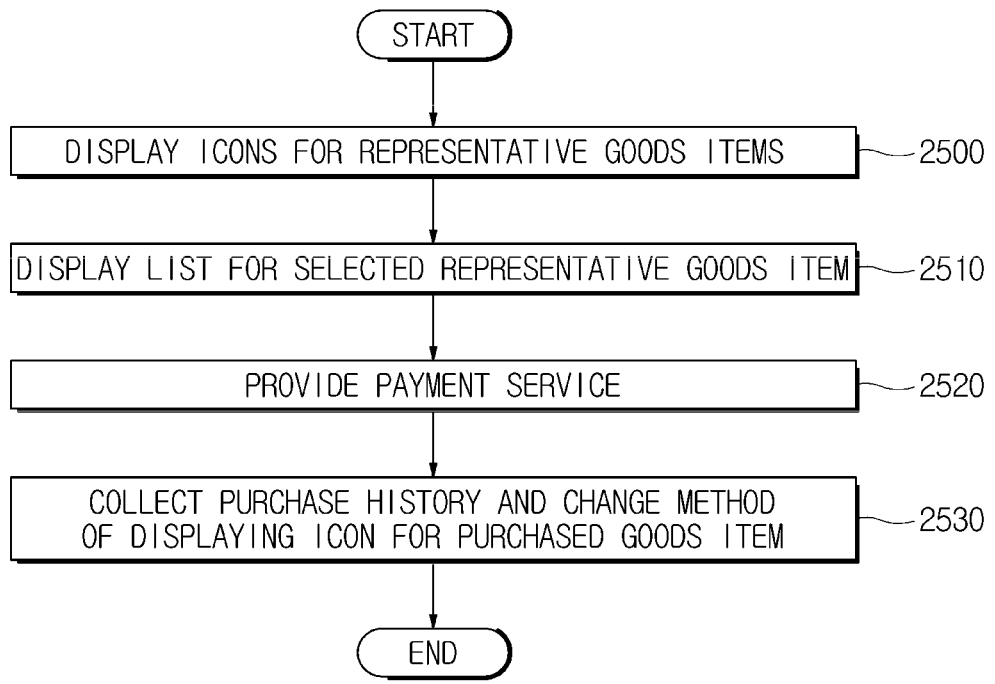
FIG. 27, FIG. 28 and FIG. 29 illustrate flowcharts illustrating operations of a refrigerator, according to various embodiments of the present disclosure.
Figure 28:
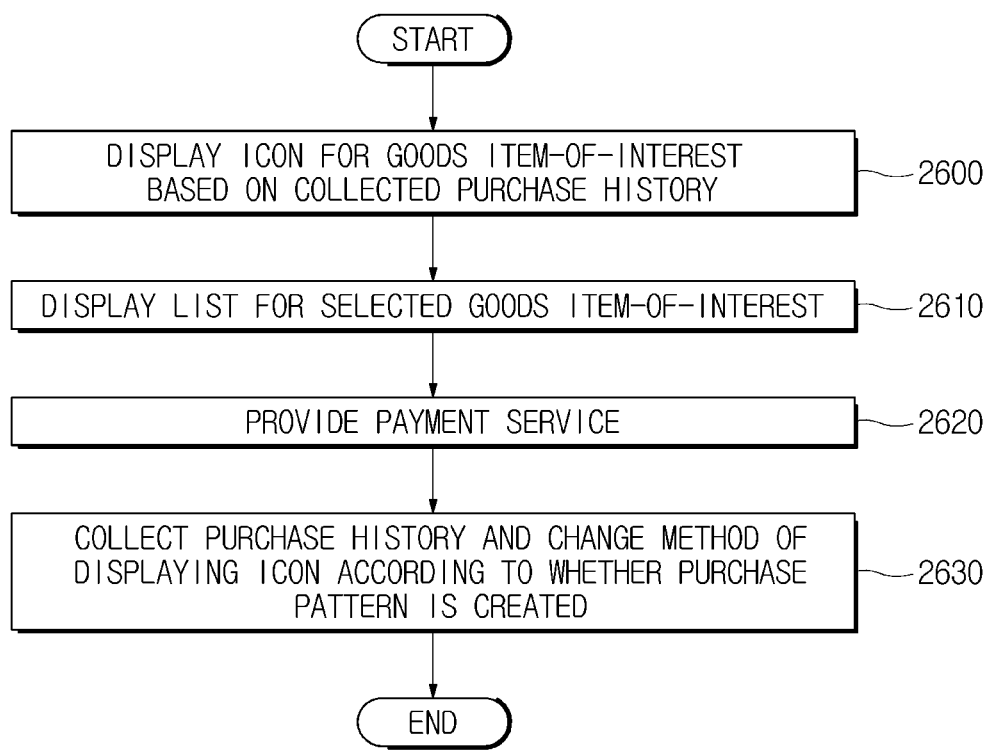
Figure 29:
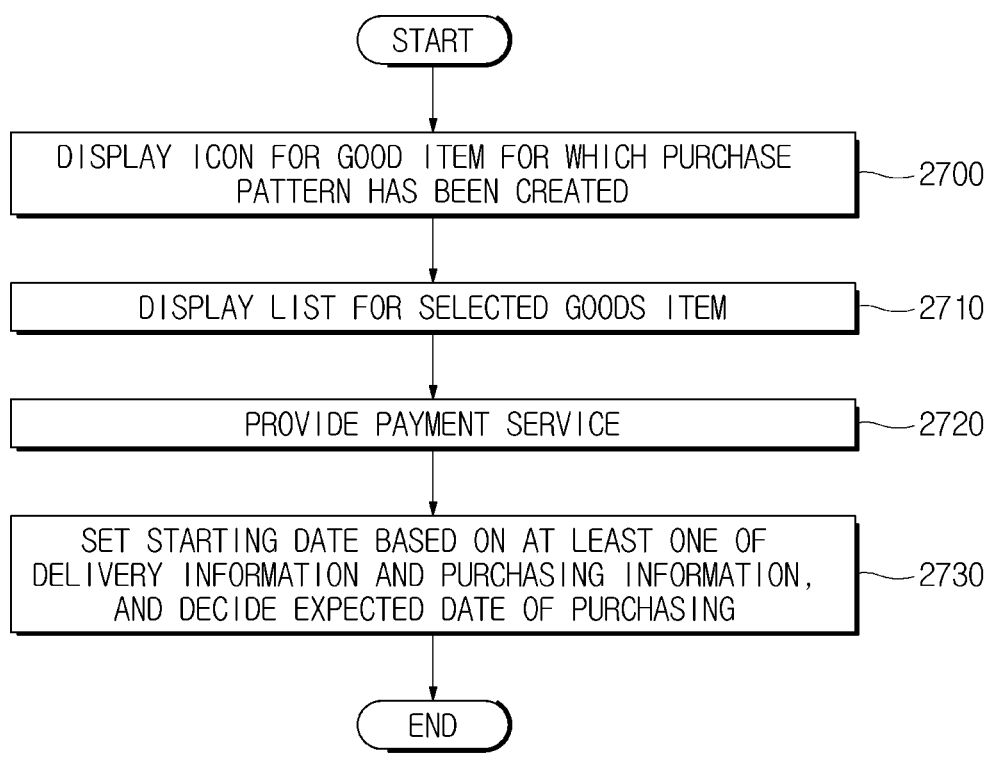

FIGS. 27 to 29 are flowcharts illustrating operations of a refrigerator, according to various embodiments of the present disclosure.

A refrigerator may arrange one or more icons on a display unit to enable a user to easily purchase goods items. The icons may be displayed for individual goods items so that the user can quickly purchase his or her desired goods items through the icons.

If the user's purchase histories for goods items do not exist, the refrigerator may display icons for representative goods items on the display unit, in operation 2500. Herein, the representative goods items may be goods items that need to be purchased in bulk and are repeatedly purchased, in consideration of the characteristics of goods items and a general user's characteristics. Data about the representative goods items may be stored in memory or an external device. If data about the representative goods items is stored in an external device, the refrigerator may access the external device through a communication network to receive the data about the representative goods items.

The refrigerator according to an embodiment may display icons for representative goods items having high probability that users will repeatedly purchase the goods items on the display unit to induce the user to repeatedly purchase the goods items, thereby collecting information about the user's characteristics.

The refrigerator may display a list for a representative goods item corresponding to an icon selected by the user from among the icons for the representative goods items, through an input unit configured to receive various commands from the user or the display unit implemented as a touch screen type, in operation 2510. That is, since each icon is mapped to a representative goods item, the refrigerator may display, if the user selects an icon, a list for a representative goods item mapped to the icon on the display unit.

The list may include information about products that are sold at various on-line shopping malls. For example, the list may include various information, a product name, a product image, a manufacturing company, a brand, a price, delivery information, etc., which the user may need when purchasing a product. For example, if a representative goods item that the user wants to purchase is wine, the list may display information about various kinds of wines that are released from various manufacturing companies.

If a product to be purchased, a purchasing quantity, and information about an on-line shopping mall are received from the user, the refrigerator may provide a payment service, in operation 2520. For example, the refrigerator may connect to the on-line shopping mall through a communication network to display a payment screen. Accordingly, the user may conveniently purchase a product that he or she wants to store in the refrigerator.

Meanwhile, the refrigerator may collect the user's purchase history, store the user's purchase history in database, and change a method of displaying an icon for the purchased goods item, in operation 2530. That is, the refrigerator may collect the user's purchase history so as to create a user interface suitable for the user, while changing a method of displaying an icon so as to induce the user to repeatedly purchase a goods item purchased by him or her. The method of displaying the icon has been described above, and accordingly, a further description thereof will be omitted.

The refrigerator may display an icon for a goods item-of-interest based on the collected purchase history, in operation 2600. The goods item-of-interest may be a goods item that the user has purchased at least one time.

The refrigerator may display the icon for the goods item-of-interest, together with the icons for the representative goods items, on the display unit. However, a method of displaying the icon for the goods item-of-interest may be different from a method of displaying the icons for the representative goods items, and the icon for the goods item-of-interest may be positioned ahead of the icons for the representative goods items.

Meanwhile, if the user selects the icon for the goods item-of-interest from among the icons displayed on the display unit, the refrigerator may display a list for the selected goods item-of-interest, on the display unit, in operation 2610. At this time, the list for the goods item-of-interest may include the name of a product that the user has ever purchased, and an image of the product, and also, include a price and delivery information for each on-line shopping mall.

The user may tend to purchase a product that he or she has ever purchased. Accordingly, the refrigerator may display information about products having the user's purchase histories, thereby preventing inconvenience occurring when the user should select products one by one.

If a purchasing quantity and information about an on-line shopping mall are received from the user, the refrigerator may provide a payment service, in operation 2620. A method of providing the payment service has been described above in operation 2520, and accordingly, a further description thereof will be omitted.

Meanwhile, the refrigerator may collect the user's purchase history, store the user's purchase history in database, and change a method of displaying an icon for the purchased goods item, in operation 2630. That is, the refrigerator may collect the user's purchase history so as to create a user interface suitable for the user, while changing a method of displaying an icon so as to induce the user to repeatedly purchase a goods item purchased by him or her.

Particularly, if the user's purchase histories are collected a predetermined number of times or more so that a purchase pattern is created, the refrigerator may change a method of displaying an icon for a goods item for which a purchase pattern is created.

Also, the refrigerator may differentiate a method of displaying a goods item having a purchase history from a method of displaying a goods item having no purchase history, and also change a method of displaying an icon according to the number of times by which purchase histories are collected. That is, the refrigerator may differentiate a method of displaying an icon for a goods item having more purchase histories from a method of displaying an icon for a goods item having less purchase histories so that a user can easily identify the icon for the goods item having the more purchase histories. A method of displaying an icon may be implemented by various well-known methods that can be implemented through graphics.

The refrigerator may display the icon for the good item for which the purchase pattern has been created, in operation 2700. A method of displaying the icon for the good item for which the purchase pattern has been created have been described above, and accordingly, a further description thereof will be omitted.

The refrigerator may display at least one of an icon for a goods item for which a purchase pattern has been created, an icon for a goods item for which a purchase history has been collected, and an icon for a goods item having no purchase history, on the display unit, in operation 2700. At this time, the refrigerator may set an arrangement of the icons in order of importance.

For example, the refrigerator may first locate an icon for a goods item for which a purchase pattern has been created, then locate an icon for a goods item for which a purchase history has been collected, and finally locate an icon for a goods item having no purchase history. At this time, the refrigerator may decide an arrangement order between the icon for the goods item for which the purchase pattern has been created and the icon for the goods item for which the purchase history has been collected, according to the number of times by which purchase histories have been collected, that is, the number of times by which the corresponding goods item has been repeatedly purchased.

Meanwhile, the user may select the icon for the goods item for which the purchase pattern has been created, from among the icons displayed on the display unit. Accordingly, the refrigerator may display a list for the goods item mapped to the icon selected by the user, on the display unit, in operation 2710.

At this time, the refrigerator may reduce information that needs to be input by the user, based on the purchase pattern, thereby increasing the user's convenience. For example, the list may include the name of a product that the user has ever purchased, and an image of the product, and also, include a price and delivery information for each on-line shopping mall. Also, various information that the user needs to input when purchasing and that can be determined based on the purchase pattern may have been selected in advance. For example, in a button allowing a user to select a purchasing quantity, the user's average purchasing quantity may have been selected in advance.

Accordingly, if the user requests payment for the product, the refrigerator may provide a payment service for the product, in operation 2720. The payment service has been described above, and accordingly, a further description thereof will be omitted.

Meanwhile, if payment is made, the refrigerator may set a starting date based on at least one of delivery information and purchasing information, and decide an expected date of purchasing based on the starting date, in operation 2730.

For example, if payment is made, the refrigerator may receive delivery information from a server of a delivery company or an on-line shopping mall through a communication network. Accordingly, the refrigerator may provide the delivery information to the user to increase the user's convenience, while determining an arrival date of the ordered product and setting the arrival date to a starting date so as to calculate the next expected date of purchasing based on the starting date. The refrigerator may include an image informing the user of a delivery state in the icon, or may provide the user with the delivery information through a progress bar, as described above.

According to another example, if the user purchased a product through another device instead of the refrigerator, the refrigerator may receive purchasing information from a card company server, etc. to determine that the user has purchased the product, based on the purchasing information. For example, if information about purchasing of a product at a specific date is included in purchasing information received from a card company server, the refrigerator may set the specific date to a starting date, and decide the next expected date of purchasing based on the starting date.

According to another example, the refrigerator may acquire identification information of a product carried through the image acquiring unit to obtain purchasing information. In this case, the refrigerator may set a date at which it acquires the identification information through the image acquiring unit to a starting date, and decide the next expected date of purchasing based on the starting date.

In this way, the refrigerator according to an embodiment may accurately determine the next expected date of purchasing so as not to provide a purchase request to the user when the previously purchased goods items are still stored in the refrigerator.

Configurations illustrated in the embodiments and the drawings described in the present specification are only the preferred embodiments of the present disclosure, and thus it is to be understood that various modified examples, which may replace the embodiments and the drawings described in the present specification, are possible when filing the present application.

The terms used in the present specification are used to describe the embodiments of the present disclosure. Accordingly, it should be apparent to those skilled in the art that the following description of exemplary embodiments of the present invention is provided for illustration purpose only and not for the purpose of limiting the invention as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

As used herein, the terms "unit", "device, "block", "member", or "module" refers to a unit that can perform at least one function or operation, and may be implemented as a software or hardware component such as a field programmable gate array (FPGA) or an application specific integrated circuit (ASIC). However, the term "unit", "device", "block", "member", or "module" is not limited to software or hardware. The "unit", "device", "block", "member", or "module" may be stored in accessible storage medium, or may be configured to run on at least one processor.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A refrigerator comprising:
   memory configured to store at least ones of characteristics of one or more goods items that are able to be stored in the refrigerator and purchasing characteristics of a user;
   a proximity sensor configured to measure a distance to the user; and
   a controller configured to:
      display, on a display unit, a user interface including at least one initial icon for at least one goods item selected based on the at least one of the characteristics of the one or more goods items and the purchasing characteristics stored in the memory,
      collect a purchase history of the user to adaptively set a method of displaying the at least one initial icon for the at least one goods item based on the purchase history,
      decide an arrangement order of the at least one initial icon based on the purchase history,
      arrange the at least one initial icon based on the arrangement order, and
      change the user interface that is displayed on the display unit based on the distance to the user.

2. The refrigerator according to claim 1, wherein the purchase history is at least one of a purchase history through the at least one initial icon, a purchase history received from the user, a purchase history derived from identification information of a goods item put in the refrigerator through image processing, and a purchase history received from an external device.

3. The refrigerator according to claim 2, wherein if the at least one initial icon is selected by the user, the controller is further configured to control the display unit to display a user interface configured with predetermined information varying according to whether there is a purchase history for a goods item corresponding to the selected at least one initial icon.

4. The refrigerator according to claim 2, wherein the controller is further configured to:
   collect the purchase history,
   store the purchase history in a database, and
   create a purchase pattern including at least one of product information, a purchasing cycle, and a purchasing quantity based on the database.

5. The refrigerator according to claim 4, wherein the controller is further configured to decide a goods item that is displayed as an icon on the display unit based on the purchase pattern for the user.

6. The refrigerator according to claim 4, wherein the controller is further configured to set a display method according to whether a purchase pattern for the goods item corresponding to an icon is created.

7. The refrigerator according to claim 4, wherein the controller is further configured to set an arrangement order of the at least one initial icon that is displayed on the display unit based on the purchasing cycle.

8. The refrigerator according to claim 4, wherein the controller is further configured to decide an expected date of purchasing based on a starting date calculated using at least one of the purchasing cycle, delivery information, and purchasing information.

9. The refrigerator according to claim 4, wherein if a plurality of expected dates of purchasing for a plurality of goods items calculated based on the purchase pattern are within a predetermined period, the controller is further configured to group the plurality of goods items to display the plurality of goods items as an icon.

10. The refrigerator according to claim 9, wherein the controller is further configured to decide a display form of the icon, based on characteristics of the goods items corresponding to the icon or images of the goods items corresponding to the icon.

11. The refrigerator according to claim 4, wherein if an expected date of purchasing for the goods item calculated based on the purchase pattern approaches within a predetermined period, the controller is further configured to transfer a purchase request message through a communication network.

12. The refrigerator according to claim 1, wherein the controller is further configured to set a method of displaying the at least one initial icon according to at least one of whether there is a purchase history for a goods item corresponding to the at least one initial icon and a number of times by which the purchase history for the goods item is collected.

13. The refrigerator according to claim 1, wherein the controller is further configured to set an arrangement order of the at least one initial icon according to whether there is a purchase history for a goods item corresponding to the at least one initial icon, and whether a purchase pattern for the goods item is created.

14. The refrigerator according to claim 1, wherein if the distance to the user measured by the proximity sensor is shorter than a predetermined distance, and an expected date of purchasing for a goods item according to a purchasing cycle is within a predetermined period, the controller is further configured to control the display unit to display at least one of a product name, an image, a quantity, price information, and a delivery date with respect to the goods item for which the expected date of purchasing is within the predetermined period.

15. The refrigerator according to claim 1, wherein the controller is further configured to initially select at least one goods item for the at least one initial icon, based on at least one of general product specific information or general purchasing characteristics comprising at least one of country specific information, region specific information or climate information.

16. A refrigerator comprising:
a communication unit configured to receive at least ones of characteristics of one or more goods items that are able to be stored in the refrigerator and purchasing characteristics of a user;
a proximity sensor configured to measure a distance to the user; and
a controller configured to:
display, on a display unit, a user interface including at least one initial icon for at least one goods item selected based on the at least one of the characteristics of the goods items and the purchasing characteristics received through the communication unit,
collect a purchase history of the user to adaptively set a method of displaying the at least one initial icon for the at least one goods item based on the user's purchase history,
decide an arrangement order of the at least one initial icon based on the purchase history,
arrange the at least one initial icon based on the arrangement order, and
change the user interface that is displayed on the display unit based on the distance to the user.

17. The refrigerator according to claim 16, wherein the controller is further configured to decide an arrangement order of the at least one initial icon based on at least one of a purchase history through the at least one initial icon, a purchase history received from the user, a purchase history derived from identification information of a goods item put in the refrigerator through image processing, and a purchase history received from an external device.

18. The refrigerator according to claim 17, wherein the controller is further configured to:
collect the purchase history,
store the purchase history in database, and
create a purchase pattern including at least one of product information, a purchasing cycle, and a purchasing quantity based on the database.

19. The refrigerator according to claim 18, wherein if a plurality of expected dates of purchasing for a plurality of goods items calculated based on the purchase pattern are within a predetermined period, the controller is further configured to group the plurality of goods items to display the plurality of goods items as an icon.

20. The refrigerator according to claim 16, wherein if the at least one initial icon is selected by the user, the controller is further configured to control the display unit to display a user interface configured with predetermined information varying according to whether there is a purchase history for a goods item corresponding to the selected at least one initial icon.

21. The refrigerator according to claim 16, wherein the controller is further configured to set a method of displaying the at least one initial icon according to at least one of whether there is a purchase history for a goods item corresponding to the at least one initial icon and a number of times by which the purchase history for the goods item is collected.

* * * * *